(12) United States Patent
Moghe et al.

(10) Patent No.: US 11,902,248 B2
(45) Date of Patent: Feb. 13, 2024

(54) CLOUD DATA LAKE PLATFORM AND SAAS ORCHESTRATION

(71) Applicant: Cazena, Inc., Waltham, MA (US)

(72) Inventors: Pratyush Moghe, Acton, MA (US); John Piekos, Westford, MA (US); Brett Russ, Rutland, MA (US); Venkat Chandra, Andover, MA (US); Brian LaChance, Hudson, MA (US); Justin Bradfield, Minneapolis, MN (US); Durgesh Mankekar, Medford, MA (US); Lovantheran Chetty, Somerville, MA (US)

(73) Assignee: Cazena, Inc., Waltham, MA (US)

( * ) Notice: Subject to any disclaimer, the term of this patent is extended or adjusted under 35 U.S.C. 154(b) by 371 days.

(21) Appl. No.: 17/375,096

(22) Filed: Jul. 14, 2021

(65) Prior Publication Data

US 2022/0021652 A1 Jan. 20, 2022

Related U.S. Application Data

(60) Provisional application No. 63/058,920, filed on Jul. 30, 2020, provisional application No. 63/053,901, (Continued)

(51) Int. Cl.
*H04L 9/40* (2022.01)
*G06N 20/00* (2019.01)
*H04L 61/4511* (2022.01)

(52) U.S. Cl.
CPC ........ *H04L 63/0236* (2013.01); *G06N 20/00* (2019.01); *H04L 61/4511* (2022.05); *H04L 63/0435* (2013.01); *H04L 63/20* (2013.01)

(58) Field of Classification Search
CPC ............ H04L 63/0236; H04L 61/4511; H04L 63/0435; H04L 63/20; H04L 63/0272;
(Continued)

(56) References Cited

U.S. PATENT DOCUMENTS

| | | | |
|---|---|---|---|
| 10,142,174 B2* | 11/2018 | Yang | H04L 67/62 |
| 2011/0145392 A1* | 6/2011 | Dawson | H04L 41/0816 709/224 |

(Continued)

OTHER PUBLICATIONS

Alrehamy et al., "Personal Data Lake With Data Gravity Pull", Aug. 2015, IEEE Fifth International Conference on Big Data and Cloud Computing, pp. 160-167 (Year: 2015).*

*Primary Examiner* — Kenneth W Chang
(74) *Attorney, Agent, or Firm* — David H. Judson

(57) ABSTRACT

A method for rapid deployment by a service provider of a data lake in association with a cloud computing service. In response to a request to provision the data lake, a new cloud account is created. Within the new cloud account, a service provider access role and associated permissions are created. The new cloud account is then associated, by cross-trust, with an account in the cloud computing service that is one of: a service provider deployment account, and a customer account. A private data cloud is then associated with the service provider deployment account or the customer account, as the case may be. The private data cloud is uniquely associated with the new cloud account and the data lake. A firewall service enabling secure access between the data lake and an external enterprise network is provisioned. The data lake is then provisioned in the private data cloud to complete the rapid deployment.

20 Claims, 19 Drawing Sheets

Related U.S. Application Data filed on Jul. 20, 2020, provisional application No. 63/051,515, filed on Jul. 14, 2020.

(58) Field of Classification Search
CPC .......... G06N 20/00; G06F 2009/45562; G06F 2009/4557; G06F 8/60; G06F 9/45558
See application file for complete search history.

(56) References Cited

U.S. PATENT DOCUMENTS

| | | | | |
|---|---|---|---|---|
| 2013/0227089 | A1* | 8/2013 | McLeod | G06F 9/45558 709/220 |
| 2014/0278808 | A1* | 9/2014 | Iyoob | G06Q 30/0206 705/7.35 |
| 2015/0067171 | A1* | 3/2015 | Yum | H04L 67/562 709/226 |
| 2015/0378769 | A1* | 12/2015 | Buck | G06F 9/45533 718/1 |
| 2016/0218991 | A1* | 7/2016 | Sharabi | G06F 9/45558 |
| 2016/0294728 | A1* | 10/2016 | Jain | H04L 47/82 |
| 2017/0041296 | A1* | 2/2017 | Ford | G06F 21/64 |
| 2017/0063615 | A1* | 3/2017 | Yang | H04L 67/62 |
| 2019/0132280 | A1* | 5/2019 | Meuninck | H04L 69/321 |
| 2019/0164063 | A1* | 5/2019 | Moura | G06N 5/02 |

\* cited by examiner

FIG. 11

CLOUD DATA LAKE PLATFORM AND SAAS ORCHESTRATION

BACKGROUND OF THE INVENTION

Technical Field

This disclosure relates generally to provisioning of services in a cloud computing environment.

Background of the Related Art

A data lake is a system or repository of data stored in its natural/raw format, typically a single store of data including raw copies of source data, as well as transformed data, used for tasks such as reporting, visualization, advanced analytics and machine learning. A data lake can include structured data from relational databases (rows and columns), semi-structured data (CSV, logs, XML, JSON), unstructured data (emails, documents, PDFs) and binary data (images, audio, video). A data lake can be established "on premises" (within an organization's data centers) or "in the cloud" (using cloud services from vendors such as Amazon®, Microsoft®, or Google®). Creating a data lake requires several tasks: acquire and deploy infrastructure, physical hardware, set up and configure compute, storage and networking, as well as big data compute engines, security and management tooling. This is a very time-consuming process, often taking a team six-to-nine (6-9) months to build a production-ready, fully-secure environment. Creating data lakes in a cloud computing environment eliminates the hurdle of buying physical hardware, but it still requires significant work sizing, configuring and deploying fully secure data lakes in a timely manner.

There remains a need to provide new methods and systems for provisioning cloud infrastructure and installation of tooling and configuration (often called DevOps) that could be performed in an automated, on-demand manner. Such a solution would (1) reduce time to value for the user; (2) eliminate the need to procure new on-premise hardware; and (3) reduce the number of people involved in software installation, and thus reduce the load on the IT organization.

BRIEF SUMMARY

The approach herein describes an architecture and platform to automatically provision secure infrastructure in any cloud with an embedded PaaS (Platform-as-a-Service) stack containing third-party or cloud-native data processing engines. For example, in one embodiment this architecture provisions a data lake in Amazon® AWS or Microsoft® Azure (and containing big data analytic engines, such as AWS EMR, Cloudera CDH or Cloudera CDP). The approach herein is extensible to any cloud or on-premises virtual cloud or containerized environment, as well as to any PaaS offering.

Cloud data lakes typically require different cloud stack capabilities to be integrated, configured and optimized together for a production cloud data environment. The approach herein automates SaaS (Software-as-a-Service) Orchestration to deliver a production-ready cloud data lake that is available for use upon completion of the provisioning. These data lakes preferably are provisioned with optimal "shapes" (configurations) that deliver maximum performance, preferably within a user-defined cost threshold. Production-ready data lakes thus are accessible for analytics upon provisioning, thereby driving down the time to analytics from months, typical for a do-it-yourself (DIY) data lake, down to minutes.

More specifically, a method for rapid deployment by a service provider of a data lake in association with a cloud computing service. In response to receipt of a request to provision the data lake, a new cloud account in the cloud computing service is created. Within the new cloud account, a service provider access role and associated permissions are created. The new cloud account is then associated, by cross-trust, with an account in the cloud computing service that is one of: a service provider deployment account, and a customer account. A logically-isolated virtual network is then associated with the service provider deployment account or the customer account, as the case may be. The logically-isolated virtual network is sometimes referred to herein as a "private data cloud" (PDC) or "virtual private cloud" (VPC) because preferably it is single tenant-based and is not visible (accessible) via the public-routed Internet. The PDC is uniquely associated with the new cloud account and the data lake. A firewall service enabling secure access between the data data lake and an external enterprise network is also provisioned. The data lake is then provisioned in the private data cloud to complete the rapid deployment.

The foregoing has outlined some of the more pertinent features of the subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter herein and the advantages thereof, reference is now made to the following descriptions taken in conjunction with the accompanying drawings, in which:

FIG. 11 depicts a representative console interface from which cloud applications can be provisioned or decommissioned according to a further feature of this disclosure;

DETAILED DESCRIPTION

Figure 1:
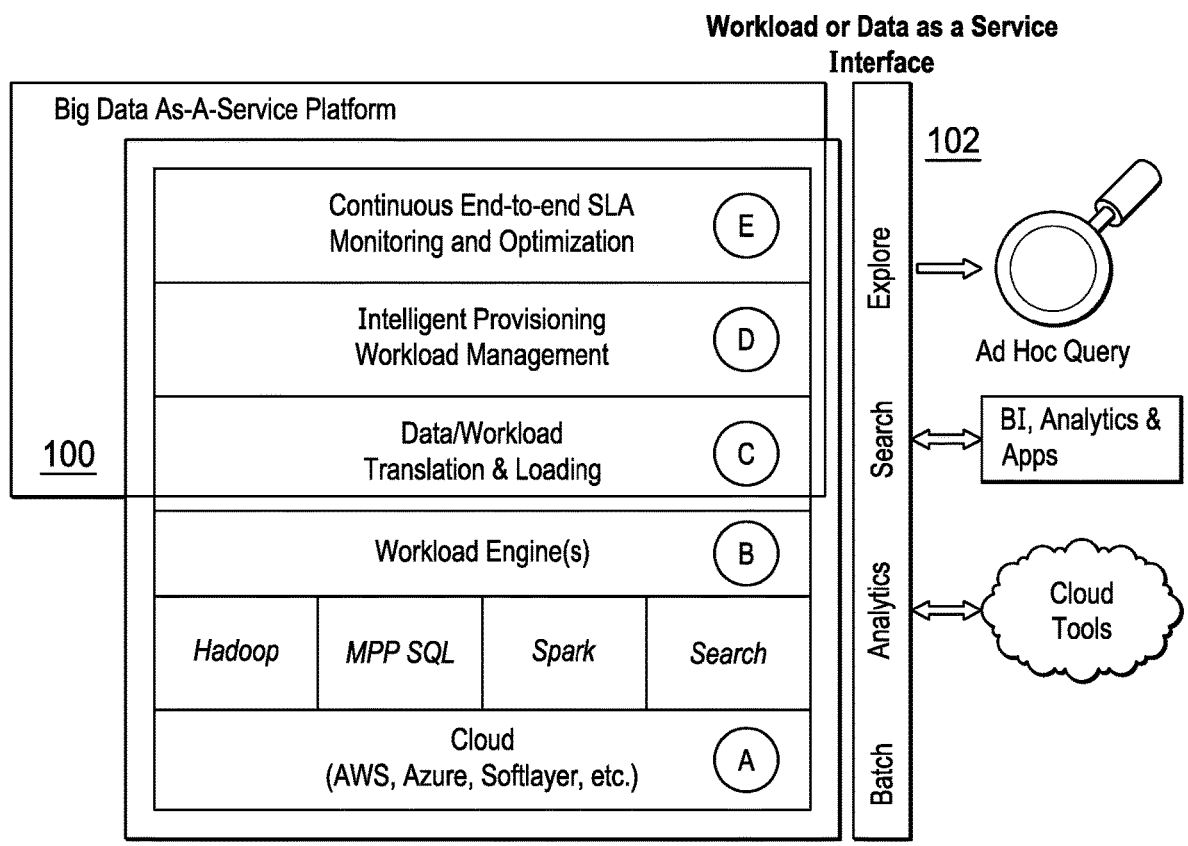
FIG. 1 depicts an exemplary block diagram of a known distributed data processing environment in which exemplary aspects of the illustrative embodiments may be implemented.

The techniques herein are implemented from a network-accessible platform, which platform operates in association with, on the one hand, an enterprise analytics data infrastructure, and, on the other hand, a cloud computing infrastructure. A "customer" or "user" of the platform typically is an enterprise that desires to execute an analytics application "workload" against a set of enterprise data. Typically, the enterprise data comprises one or more data sources, and the notion of "enterprise data" is not necessarily limited to data that is actually sourced from the enterprise. The service platform of this disclosure acts as an intermediary between the enterprise analytics data infrastructure (which, typically, is "on-premises") and the underlying cloud compute resources that are to be provisioned and utilized by the enterprise for executing the workload. Typically, a "workload" as used herein refers to the operations that are performed by the analytics applications with respect to the enterprise data. According to this disclosure, that "workload" gets executed in the "cloud," but in a seamless and efficient manner. In this way, both the enterprise data itself and the analytics operations on that data are off-loaded to the cloud, but in a manner that provides the enterprise customer with only the amount of "resources" needed for the workload, and in a reliable and cost-effective manner.

By way of background, cloud computing is a model of service delivery for enabling on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. Available services models that may be leveraged in whole or in part include: Software as a Service (SaaS) (the provider's applications running on cloud infrastructure); Platform as a service (PaaS) (the customer deploys applications that may be created using provider tools onto the cloud infrastructure); Infrastructure as a Service (IaaS) (customer provisions its own processing, storage, networks and other computing resources and can deploy and run operating systems and applications).

Typically, a cloud computing infrastructure may comprise co-located hardware and software resources, or resources that are physically, logically, virtually and/or geographically distinct. Communication networks used to communicate to and from the platform services may be packet-based, non-packet based, and secure or non-secure, or some combination thereof.

The services platform described may itself be part of the cloud compute infrastructure, or it may operate as a stand-alone service that executes in association with third party cloud compute services, such as Amazon® AWS, Microsoft® Azure, IBM® SoftLayer®, Google GCP and other private cloud services (such as private cloud services or container-based services).

Typically, the enterprise analytics infrastructure is a standard analytic stack data flow comprising one or more data warehouses or data marts, ETL processes, workload engines (e.g., databases such as Hadoop, MPP SQL, Search or Spark), and analytics applications, such as business intelligence tools, advanced analytics tools, and the like. As is well known, a data warehouse, sometimes referred to an enterprise data warehouse (EDW), is a system used for reporting and data analysis. Data warehouses are central repositories of integrated data from one or more disparate sources. Typically, they store current and historical data. A data mart is a type of data warehouse that is focused on a single subject or functional area. Data marts usually draw data from only a few sources, such as internal operational systems, a central data warehouse, or external data. An extract-transform-load (ETL) process provides staging, data integration, and access layers. The staging layer stores raw data extracted from each of the disparate source data systems. The integration layer integrates the disparate data sets by transforming the data from the staging layer. The integrated data are then moved to the data warehouse database, where the data is arranged, typically into hierarchical groups. The access layer helps users retrieve data. The particular details of the enterprise data analytics layer are not a limitation of this disclosure, as the services platform is designed to operate with any type of components that may comprise the enterprise data analytics environment.

In particular, and as will be described, multiple enterprise customers use the services platform to offload data analytics workloads to "data clouds" that are intelligently provisioned and managed by the services platform. Each customer's workload may be executed in the cloud securely and privately, and in a manner that, for a given customer, meets a service level objective and cost.

By way of additional background, FIG. 1 illustrates how a services platform 100 functions as an intermediary between the enterprise and the cloud compute infrastructure. As seen in FIG. 1, layer A represents that underlying cloud compute resources on which the data analytics application commands are executed against one or more workload engines, which are represented as layer B. The compute cloud and the workload engines are not necessarily part of the services platform but they are accessible thereby. The services platform 100 typically comprises Layers C, D and E.

Layer D (Intelligent Provisioning/Workload Management) provides the basic resource provisioning of the underlying compute cloud infrastructure, which includes the "data warehouse environment" including storage, compute nodes, networking, as well as the specific workload engine (a database, for example, a Hadoop distribution with specific configuration), which often is available from the cloud provider. As used herein, a workload engine refers to a database or data processing engine, such as (without limitation) those based on SQL, Hadoop, NoSQL, and others. Preferably, provisioning is done based on static information provided by the enterprise, or based on a "profiler" that profiles a specific workload and derives "optimal" provisioning based on cost, utilization and SLA requirements for the unique characteristics of the workload. This type of optimal provisioning ensures adequate workload performance at the lowest cost cloud footprint. As will be described, the resource provisioning is instantiated from a simple user interface console using a small set of basic inputs.

In general, the provisioning layer optimally provisions resources in the cloud by matching workload resource requirements to resource bundling options available in the cloud. To this end, the layer includes a workload profiler that accepts historical workload information comprising, for example, a plurality of database log files, application log files, and query system views, along with actual and projected workloads. It uses this information to produce a description of the workload resource requirements. A provisioning optimizer accepts the profiled workload resource requirements, along with service level agreements and cost requirements, and descriptions of the resource bundling options available in the cloud, and calculates the optimal cloud provisioning. This optimal cloud provisioning typically is a subset of the available cloud compute resources, and it may include an identification of one or more workload engines (e.g., databases) that will store the data and against which a workload (a set of commands from an analytics application, a set of search queries, etc.) will be executed.

In one embodiment, the historical log files and databases comprise descriptions of specific database queries, such descriptions comprising an identifier and text of a database query, the time the query was submitted and the time it completed, an execution plan for the query comprising a number of database operations, the estimated and actual costs and resources required for each database operation in the execution plan. The historical log files and databases may also comprise aggregated information about queries submitted over a period of time, such aggregated information comprising the number and total amount of time and total resources used by all queries over the period of time, grouped by type of resource and by database operation. By way of example, this aggregated information may indicate the total number of sequential disk scan operations across all queries over a period of time, along with the total number of bytes scanned, and the total time required to do the scanning.

In one embodiment, the service level agreements comprise a plurality of performance specifications. A performance specification may indicate a scheduling requirement as the time at which a particular workload is to complete. A performance specification may indicate a latency requirement as a percentage of cases in which a workload is to complete within a given amount of time after it is submitted. A performance specification may indicate a throughput requirement as the number and type of workloads to be completed within a period of time. With each specification in the service level agreements, there is a cost associated with failure to satisfy the condition. These costs may be arbitrary functions of both the size and the duration of the failure.

In one embodiment, the resource bundling options available in the cloud are derived by accessing public APIs provided by commercial cloud vendors and stored in database tables, whose columns indicate a cloud vendor, a locale, a resource-bundling-name, and a description of the types and amounts of resources provided in the bundling option. Said resources comprise compute resources, memory resources, disk resources and network resources. Said compute resources comprise number of cores, cycle time (GHz) and operations per second, processor type and instruction set (such as GPU/CUDA or CPU/ix86 or FPU). Said memory resources comprise memory level (L1 cache, L2 cache, L3 cache, general memory), #bytes-per-level, time to move data from memory level to processing unit. Said disk resources include type (SSD, magnetic disk), capacity in byte, read seek time, write seek time, #bytes/sec for reads and writes, IOPS. Said network resources comprise network type, #bytes/sec.

In one embodiment, the optimal cloud provisioning comprises a list of available provisioning options, ordered from best to worst, where each option comprises a workload description, a cloud provider, cloud locale, a number and type of virtual computational nodes, and a number and type of storage options. The term "optimal" is not intended to be limiting. The workload description comprises any or all of the workloads. The cloud provider may be a commercial vendor or a private on-premises cloud. The cloud locale describes the geographical region in which the cloud is to be provisioned. The type of virtual computational is a specific bundling of computational resources; and a storage option is a specific bundling of storage capacity and performance. In an embodiment supporting elasticity, the provisioning options further comprise range information describing the minimum, maximum and average number of virtual computational nodes of given types, along with the standard deviation.

Layer E (Continuous SLA Monitoring and Optimization) ensures that the cloud compute resources are optimized, for example, based on an actual delivery of an SLA and cost over a certain period of time. This layer includes functionality that computes the utilization and SLA for workloads, for example, over daily, weekly, monthly windows. Based on one or more rule-based triggers, the optimization layer can alert or create reports if there is persistent under-allocation or over-allocation of resources. When this happens, Layer E can allocate a specific "re-provisioning time window," where the system resources are dynamically altered. Alteration as used herein may refer to an increase or decrease in the number of nodes provisioned based on the observed rules, altering specific "type" of nodes to increase or decrease performance based on specific I/O, compute or memory characteristics, altering the specific location of the processing (regions) to reduce latency and contention, or shifting the workload to an alternative cloud provider (e.g., if there is a persistent issue tied to the current provider).

Layer C (Data Translation and Loading) ensures that the enterprise data is loaded in an optimal way into the right workload engine environment. The "loading" function typically is carried out by one or more "data movers" that are integrated into the enterprise environment or that work in conjunction therewith. In some cases, the enterprise data may need to go through translation (such as schema translation, conversion of keys, compression, and so forth) to the right environment. For example, moving data from SMP databases to MPP databases require steps in terms of schema mapping, sort and distribution keys. This layer takes care of the specific issues involved in moving data sources to targets (the workload engines themselves).

Access to the services platform 100 may be provided via a services interface 102 through which enterprise users may perform queries, execute workloads (typically search queries instituted from Business Intelligence tools, Advanced Analytics applications, etc.), and the like. The service interface 102 may be implemented as a manual CLI or GUI-based interface, an application programming interface (API), or some other such mechanism.

Figure 2:
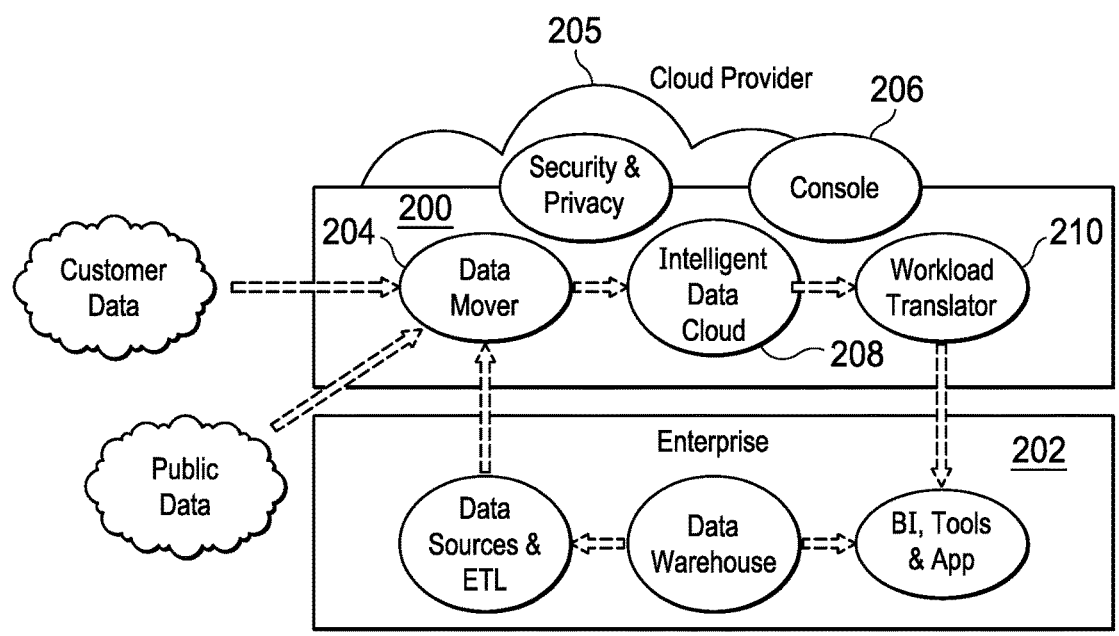
FIG. 2 illustrates how the services platform of this disclosure provides an overlay on an enterprise data analytics layer.

FIG. 2 illustrates the services platform 200 of FIG. 1 positioned as an "overlay" on the enterprise data analytics infrastructure 202. As noted, the enterprise analytic stack data flow includes the ETL, data warehousing, EDW, and BI/advanced analytic tools. The enterprise infrastructure also may comprise log and unstructured data aggregation, Hadoop processing, other analytic processing tools, and the like. Block 202 shows one specific cloud provider and its cloud offerings (such as compute nodes, storage nodes, and the like). The service platform, as noted, is architected to support multiple cloud providers, only one of which is shown in FIG. 2.

As noted, the service includes a number of functional modules. The data mover functionality 204 provides automated life-cycle management of the enterprise data that needs to be exported to the services platform. As will be described, this functionality provides a flexible data collection tool (or tool set) that aggregates structured and unstructured data from a number of different enterprise data sources including, without limitation, ETL servers, files, logs, or databases or data warehouses. Data is collected based on specific rules and filters so that only required subset of data is collected. Preferably, a data mover component can incorporate data from existing collection agents such as sqoop or flume or fluentd, or via other data ingest mechanisms such as Glue or Managed Streaming with Kafka (MSK) etc. or third party capabilities such as StreamSets or Informatica etc. The data mover functionality may be implemented in software, in hardware-based appliance, in specialized server machines, or the like. Aggregated data either is moved to the cloud directly, or it can be staged (e.g., on a staging server/appliance) and then scheduled for delivery at the most efficient and optimal times. Preferably, a data mover provides one or more transformations, such as data compression, and data encryption. In particular, preferably all data that is collected is compressed using a variety of techniques best suited to the type of data. Preferably, the data is encrypted with standard enterprise-class standards. Optionally, the service provides a full end-to-end encrypted tunnel for support of analytics on encrypted data. Preferably, the enterprise data is moved into the cloud (and, in particular, into the workload engine(s)) via a specialized delivery protocol that ensures reliability and high-performance of delivery. A particular data mover may also leverage third party mechanisms, such as AWS Direct Connect, or any other delivery protocol that the cloud providers offer to the enterprises. Generally, and as described, a particular data mover supports streaming, scheduled or one-time data movement. In a preferred embodiment, and as will be described, a data mover is built to layer on top of existing cloud provider offerings (such as AWS S3 and others) so that it provides seamless big data movement with a few clicks. A particular data mover is instantiated and orchestrated by a user console 206.

The console 206 is a configuration tool or portal for the service. In one embodiment, the console is a display interface configured as a web-accessible tool, such as a set of TLS/SSL-secured web pages. A customer registers to use the service, and permitted users associated with the enterprise customer receive access credentials. Users may be authenticated and authorized to use the interface in any known manner. The console 206 provides the user experience, management and policy capabilities for the overall platform. The console 206 also exposes administration interfaces by which the service provider creates a customer account and instantiate a specific platform for the customer. This may involve the orchestration of a private cloud for the customer within the third party cloud compute infrastructure. Once the customer account is established, permitted users associated with the enterprise access and use the service. To this end, a given analytics application workload is processed using a simple user interface by which the user designates a simple data set, such as type of data to be moved, volume of data, type of workload engine, information about the analytic application, information regarding required SLA, or cost, etc. The enterprise customer preferably identifies the size of the workload using a simple and small set of generic categories (e.g., "small," "medium" or "large"), and identifies the enterprise data that will be subjected to the workload. The information provided by the user also indicates the one or more data sources from which the data will be obtained, as well as the "type" of the workload engine (e.g., Hadoop, MPP SQL, etc.). Based on this simple data set, the data cloud 208 (or "cluster") is created and made available to the enterprise user for workload processing.

In particular, the data cloud is instantiated based on the information captured by the console. As noted above, preferably the data cloud comprises the underlying cloud compute layer 202 (that does not get exposed to the user), as well as support for the workload engines (Layers A and B in FIG. 1). As noted above, preferably the provisioning of the data cloud 208 is done based on static information provided by the enterprise, or based on a "profiler" that profiles a specific workload and derives "optimal" provisioning based on cost, utilization and SLA requirements for the unique characteristics of the workload. The provisioning ensures adequate workload performance at a lowest cost cloud footprint.

The profiler and the resource-provisioning functionality greatly simplify the user experience and interface between the enterprise and the cloud. In the past, the end user interacted with the cloud directly and had to manually pick piece parts, such as type of nodes, number of nodes, specific type of database distribution, etc., often without a good understanding of how such selections impacted the overall performance. The provisioning capability in the platform simplifies the user interface for enterprises. Using the interface, the end user identifies a given service level (e.g., the processing of the workload needs to be processed "within X time") at a particular cost (e.g., $Y dollars per unit time). Based on these simple high level inputs and the other information in the user-configured data set, a profiler and resource provisioning function (FIG. 1, Layer D) optimally provisions the underlying cloud compute infrastructure without involving enterprise personnel into technical details. This provisioning typically is in the form of instructions that are provided by the platform to the underlying cloud compute infrastructure.

As also seen in FIG. 2, the services platform may provide a workload translator 210 to ensure that existing analytic tools (e.g., such as Business Intelligence, AI/ML, Data Engineering, Advanced Analytics, etc.) that are deployed in the enterprise work seamlessly with the services platform. With the workload translator 210 in place, typically, such tools are just re-targeted to point to the services platform and do not need to be modified. A security and privacy layer 212 is operative to ensure that enterprise security and privacy policies are extended to the service platform. Preferably, the platform provides network and user-level AAA (access control, authentication, and authorization). Preferably, access control is role-based and extended from the enterprise directory, such as Active Directory or LDAP. Preferably, additional role segregation is supported. As previously noted, data security is provided via encryption of data, preferably during transit and at rest. Optional features include the ability of the enterprise to control and manage the keys independent of the cloud provider or the service platform administrators. The security and privacy layer also provides for secure logging, auditing and monitoring, including alerting on any system or data-level incident. The platform may also provide compliance reporting that allows enterprises to extend their compliance posture to the cloud environment.

With the above as background, the techniques of this disclosure are now described.

Cloud Data Lake Platform and SaaS Orchestration

Figure 3:
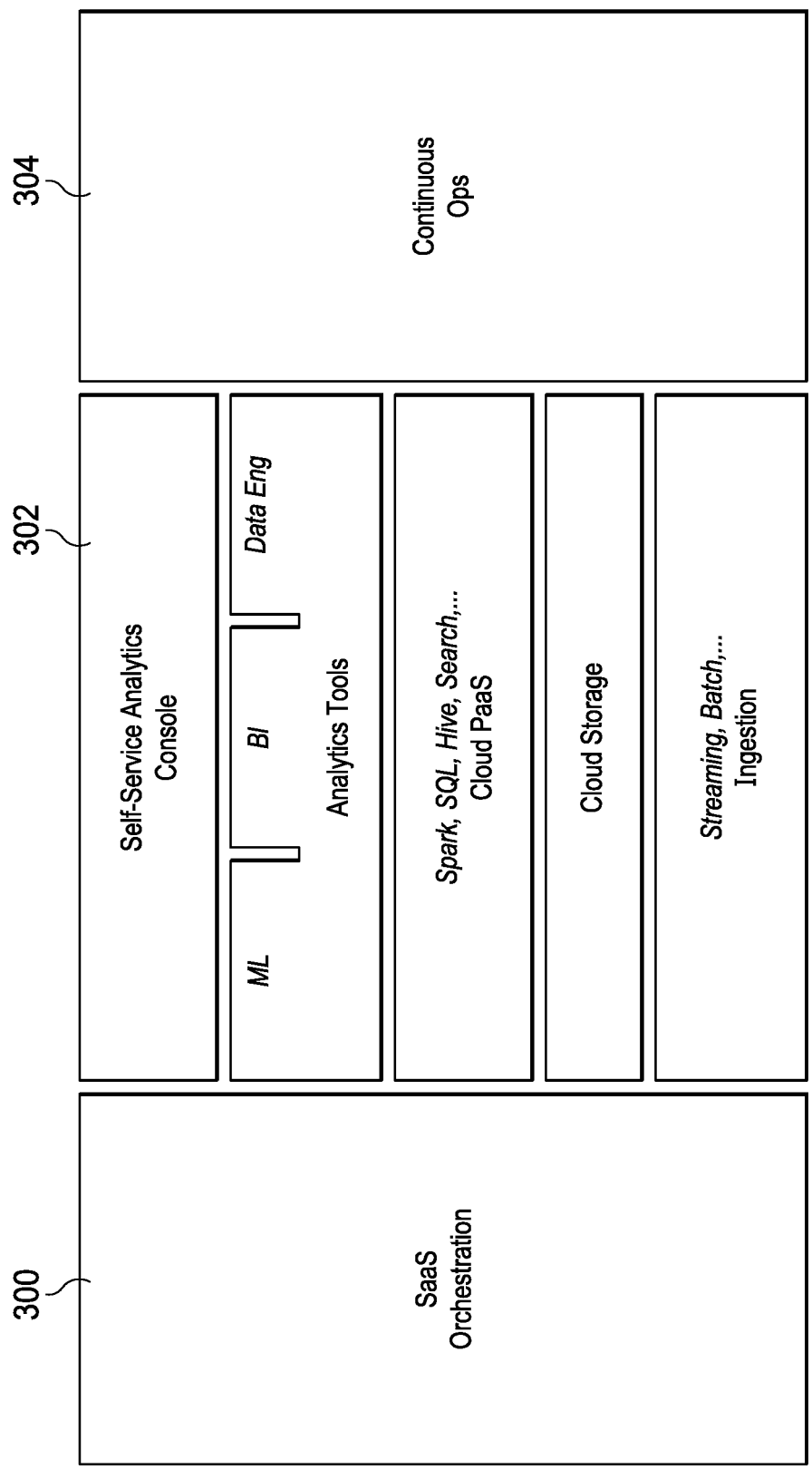
FIG. 3 depicts an implementation of a data lake provisioning and operations platform according to this disclosure.

As depicted in FIG. 3, the approach herein is implemented preferably using three (3) automated capabilities: SaaS Orchestration 300, which provides automated provisioning of a complete production cloud data lake; Self-Service Analytics 302, which provides for a simplified SaaS-based console that enables analysts and data scientists to instantly run analytics in the data lake using popular tools; and Continuous Ops 304, which provides ongoing operations for workloads, cost, security, and SLAs (service level agreements). Although the components 300, 302 and 304 are shown as distinct, this is not a requirement. These components may be integrated in whole or in part. The platform typically embeds (or has access to) a variety of best-of-breed or cloud-native PaaS, IaaS, and analytical tools, providing enterprises with maximum flexibility of price/performance and ease of use.

SaaS Orchestration

Data lakes require different cloud stack capabilities to be integrated, configured and optimized together for a production cloud data environment. According to this disclosure, the platform and method herein provide SaaS Orchestration around five (5) distinct capabilities to deliver a production-ready data lake; these capabilities include SaaS provisioning, identity management, security and privatization, hybrid deployment, and data governance and compliance. Together, these capabilities comprise a configured "data lake" according to this disclosure. Each of these capabilities is now described.

SaaS Provisioning: The platform unifies infrastructure, network, and security capabilities in a single "SaaS-as-code" instance, including (for example): data ingestion, cloud account and resources, cloud-to-enterprise virtual private networking, security perimeter, firewalls and encryption controls, storage management (object/attached/archival storage, such as S3/ADLS/ . . . ), PaaS data processing engines (such as SQL, Spark, Hive, NoSQL, etc.), and cloud infrastructure for analytical tools. According to an aspect of this disclosure, production-ready data lakes are accessible for analytics as soon as they are provisioned, and data lakes as provided for herein are provisioned with optimal "shapes" that deliver maximum performance, preferably within a user-defined cost threshold.

Identity Management: The platform also integrates disparate PaaS, cloud, and tools identities, thereby addressing a known friction point for enterprises deploying cloud data lakes. The SaaS data platform solution automates a uniform authentication and authorization mechanism across analytic tools, PaaS data processing engines, and the cloud storage resources, so that enterprise identities can be seamlessly managed with the data lake.

Security and Privatization: The SaaS data platform also automates the security policies around the data lake so that all external access is blocked with an enterprise firewall, allowing access only from specific private endpoints in the enterprise. This level of isolation makes the data lake a "private single tenant" data environment for each customer in the cloud datacenter of their choosing.

Hybrid and Multi-Cloud Deployment: Preferably, data lakes as provisioned according to this disclosure are "wired" to the enterprises with an intelligent hybrid architecture to ensure that on-premises data users and administrators all get easy access. To this end, the data lake looks like a seamless extension of the enterprise network, while it has complete security isolation at a physical level.

Data Governance and Compliance: The SaaS data platform preferably also configures auditing, discovery, and cataloging to ensure that all data access within the data lake is logged and the provenance is maintained. Preferably, data access is made visible to administrators; additionally, preferably historical system and data access activity is also centralized for compliance reporting. The SaaS data platform offers preferably offers industry-standard compliance certifications, such as SOC II-Type 2.

The following provides additional technical details regarding an implementation of the above-described platform and orchestration implementation.

In one embodiment, the SaaS-based orchestrator 300 is specifically implemented using Terraform, which is a tool for building, changing, and versioning infrastructure safely and efficiently. Terraform, which is available as an open source tool, allows the system to define numerous modules and relationships between them, thereby creating infrastructure-as-code. Preferably, each Terraform module relies on one or more "providers" to implement the underlying resources. Preferably, existing providers are extended with one or more custom providers plus custom Python, Groovy, Java, and shell script to create the turnkey service of this disclosure.

Terraform allows definition of phases of deployment, and it treats each phase as an idempotent and dynamic stack. Once the code for the data lake being provisioned is created, the Terraform infrastructure dynamically generates module dependencies based on defined system rules, creates a resource map of what exists and what needs provisioning, and then drives towards a complete and successful deployment. A typical deployment results in a large number of resources under management, all of which typically have a complex web of interdependencies that the platform then manages for the customer. Preferably, the state of these resources is captured and securely stored for future system upgrades and expansion. The Terraform solution allows the system more surgical control over changes to the deployment, e.g., to cope with dynamic workloads, upgrades, and expansion.

As an example, the following describes one specific process and implementation of the SaaS data platform and SaaS orchestration. For this implementation, it is assumed that the data lake resides within a private cloud environment (for illustration, referred to by AWS as a Virtual Private Cloud) within a Cloud provider such as AWS or Azure. This is not a limitation, however. For this example, the following steps are then carried out via automation:

Creation of a Customer-Specific Cloud Account

Because this is a private cloud environment, preferably the first step that occurs is to create a private cloud account for the deployment. A private account defines a logical boundary around the resources provisioned such that they can only be used by entities that have access to that account. Typically, there is one cloud account per platform customer. This is known as a single-tenant environment, meaning that customers do not share cloud accounts.

Creation of a Private Cloud Environment to Hold a Single Customer's Data Lake

Figure 4:
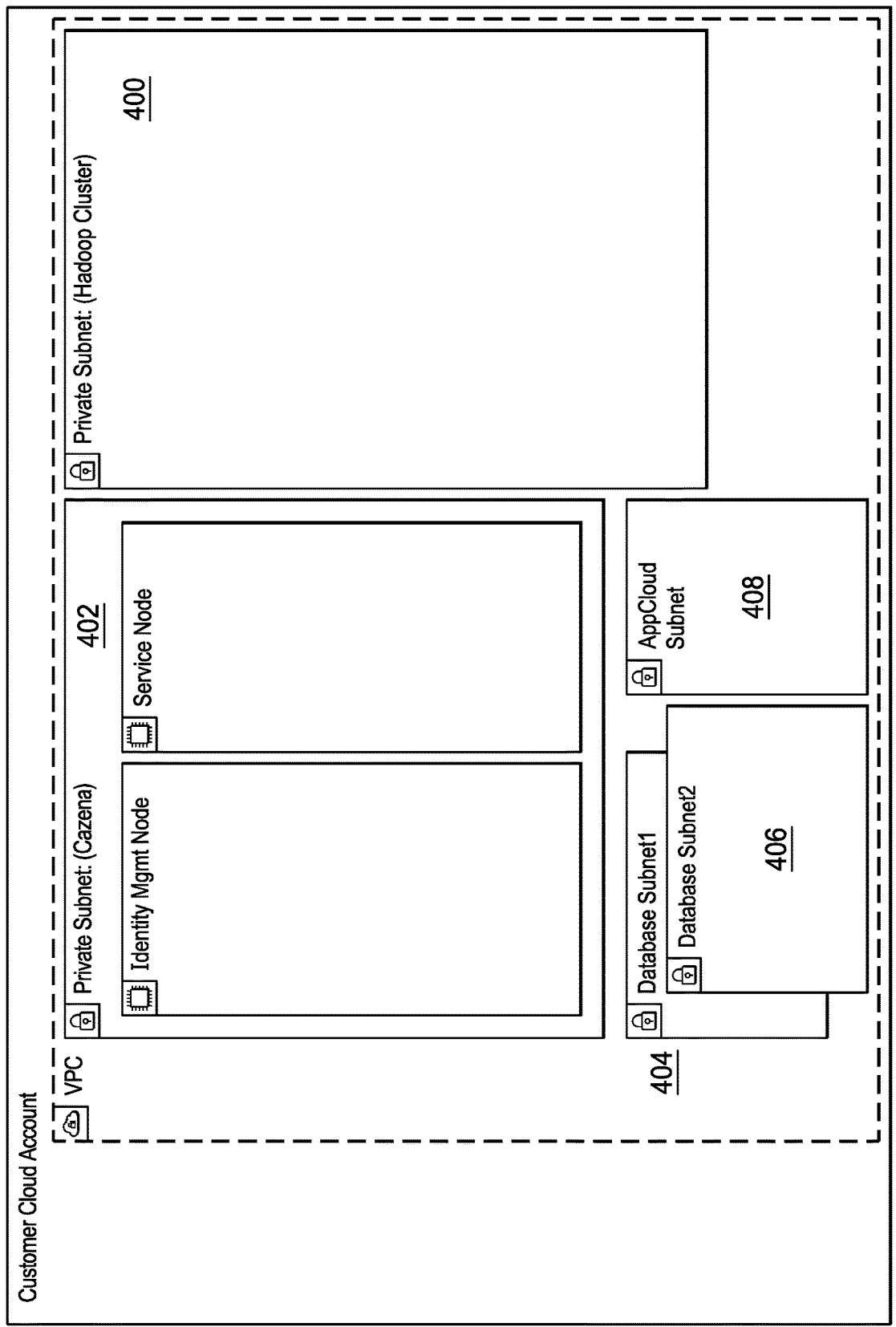
FIG. 4 depicts a representative subnet architecture of the platform.

Within the private cloud environment, the SaaS data lake preferably is provisioned across a plurality (preferably five (5)) private subnets. This configuration is depicted in FIG. 4.

One subnet 400 is for the data lake engine, such as Cloudera CDH/CDP or AWS EMR. A second subnet 402 preferably contains provider services such as monitoring and alerting, orchestration (lifecycle management), identity management and a user-visible portal through which the provider services are accessed and managed by the user. The third and fourth subnets 404, 406 preferably comprise a database replica pair to hold persistent state for the data lake users. The fifth 408 preferably holds a cloud application infrastructure (e.g. AppCloud and AppCloud applications). Once these subnets are created, the next step is to fill them to create compute services, and to fill out the data lake.

Provisioning and Configuration of Service Nodes

Figure 5:
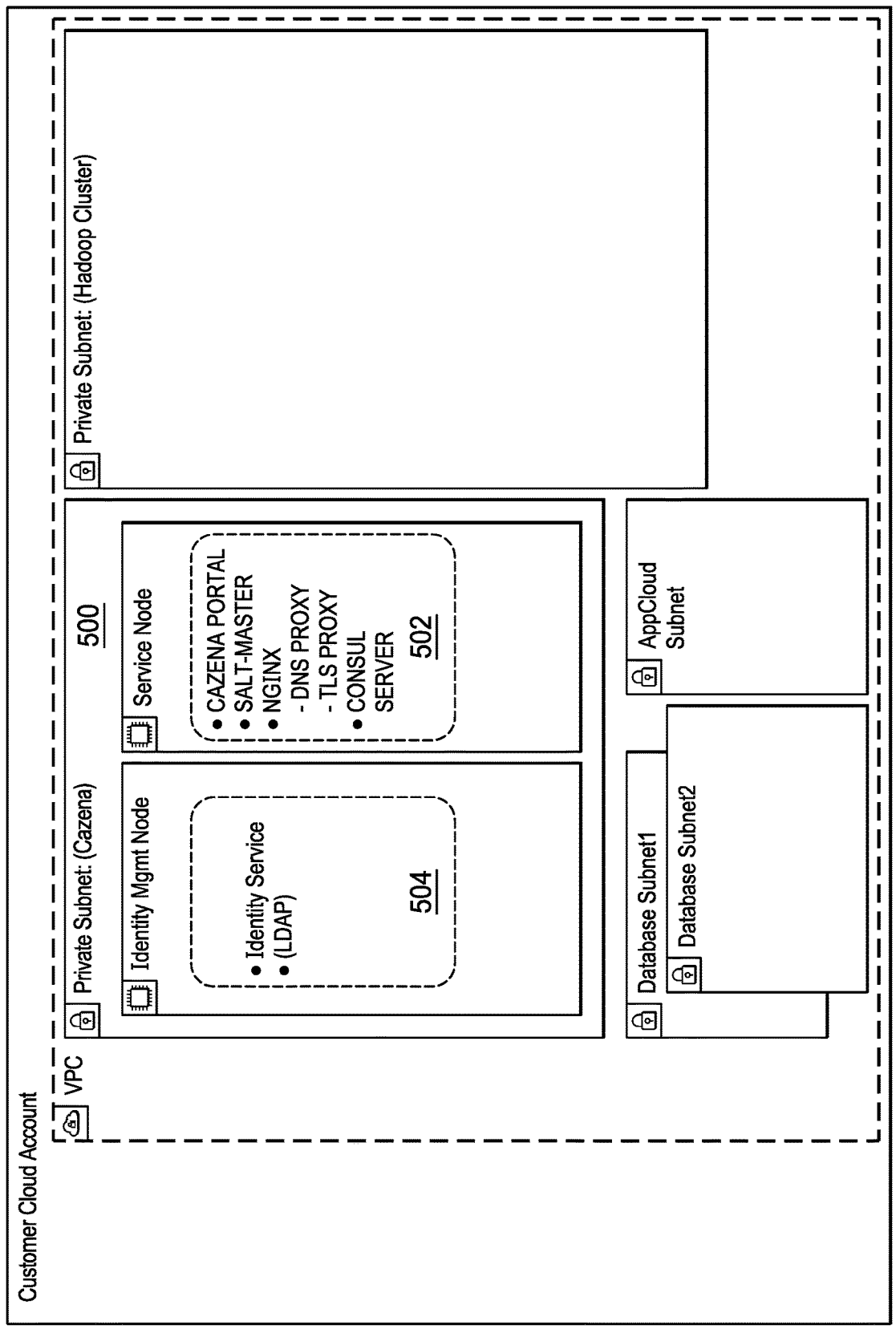
FIG. 5 depicts the provisioning of the service node subnet.

With reference now to FIG. 5, within the Provider Services subnet 500, the Service Node 502 is first provisioned and deployed. The Service Node hosts orchestration services, user console, service registry, and a configuration management server. DNS entries are then configured for the console, service registry, service node, and configuration management server. Within the Provider Services subnet 500, an Identity Management Node 504 is provisioned and deployed to host Identity Management and Authorization services. As noted above, integrating disparate PaaS, cloud, and tools identities is a big friction point for enterprises deploying cloud data lakes. The SaaS platform of this disclosure automates a uniform authentication and authorization mechanism across analytic tools, PaaS engines, and the cloud storage resources, so that enterprise identities can be seamlessly managed with the SaaS data lake. This is a challenging due to the variety of authentication technologies (such as LDAP, Kerberos, Active Directory, etc) and connectivity models (such as web interfaces, APIs, and direct shell access) that need to be supported for the flexibility enterprise customers expect. To this end, the system configures the necessary identity management server solutions (such as FreeIPA), identity brokers (like Keycloak) to provide single sign on (SSO), and federated authentication via existing enterprise solutions. While these are specific implementation details, other similar offerings can also be used instead.

Provisioning and Integration of Data Processing Engines and Analytics Services

Figure 6:
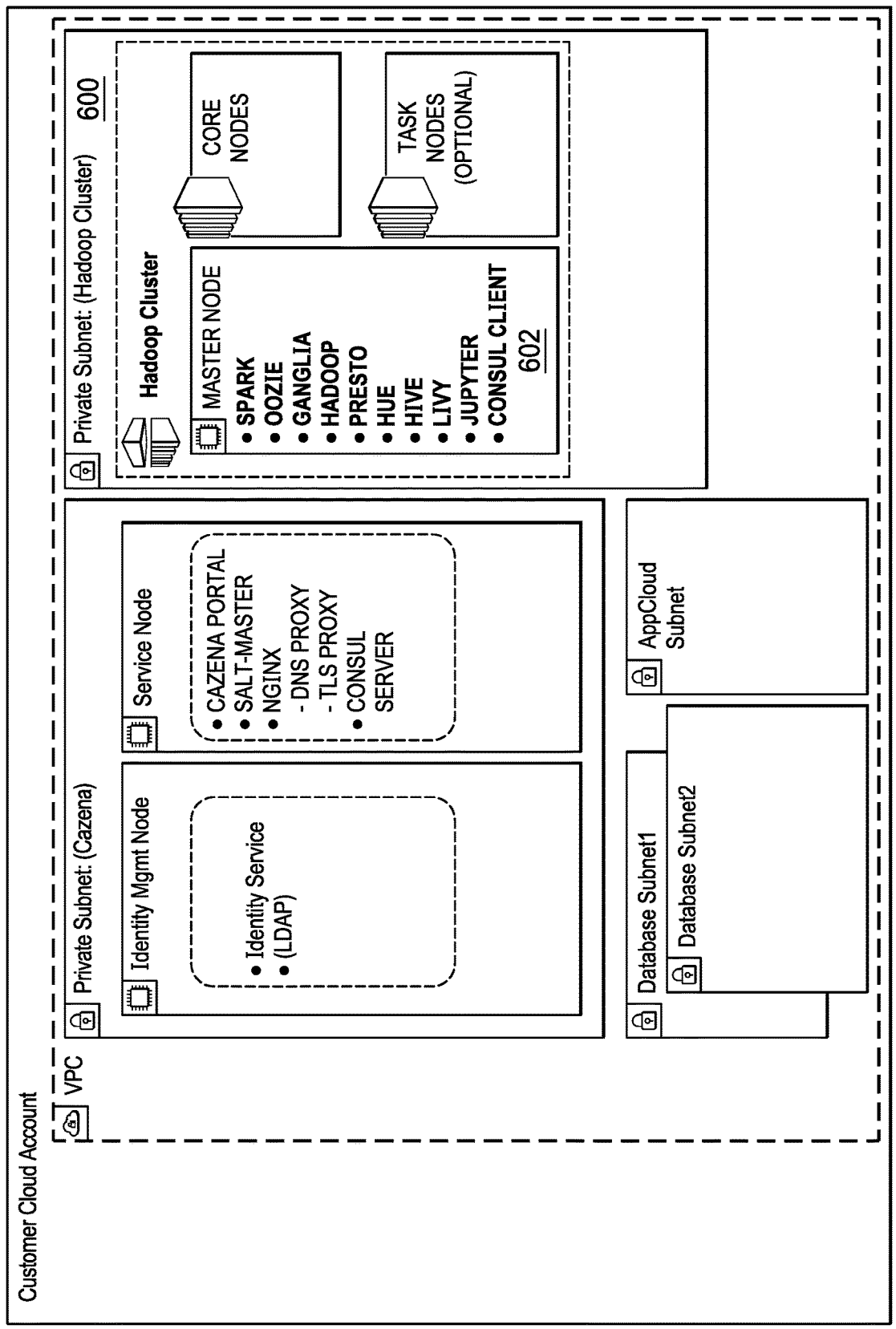
FIG. 6 depicts the provisioning of the data lake subnet.

With reference now to FIG. 6, within the data lake subnet 600, the orchestrator provisions and deploys specific data lake engines (CDP, EMR, etc.) and services (as examples, Hue, Jupyter, etc), across a pre-computed (custom size for customer workload) set of instances 602. The orchestrator also defines security rules for the data lake environment and the resources (nodes and services) within. The orchestrator defines DNS entries for services within the data lake environment (Hue, Jupiter, master node . . . ) so that users can directly interact with these services. The orchestrator also configures storage requirements, provisions storage buckets and defines access, both permissions and encryption on the cloud object Store (e.g., S3). Preferably two buckets are provisioned, one for data and one for configuration.

Configuration of User History and Service Persistence

Figure 7:
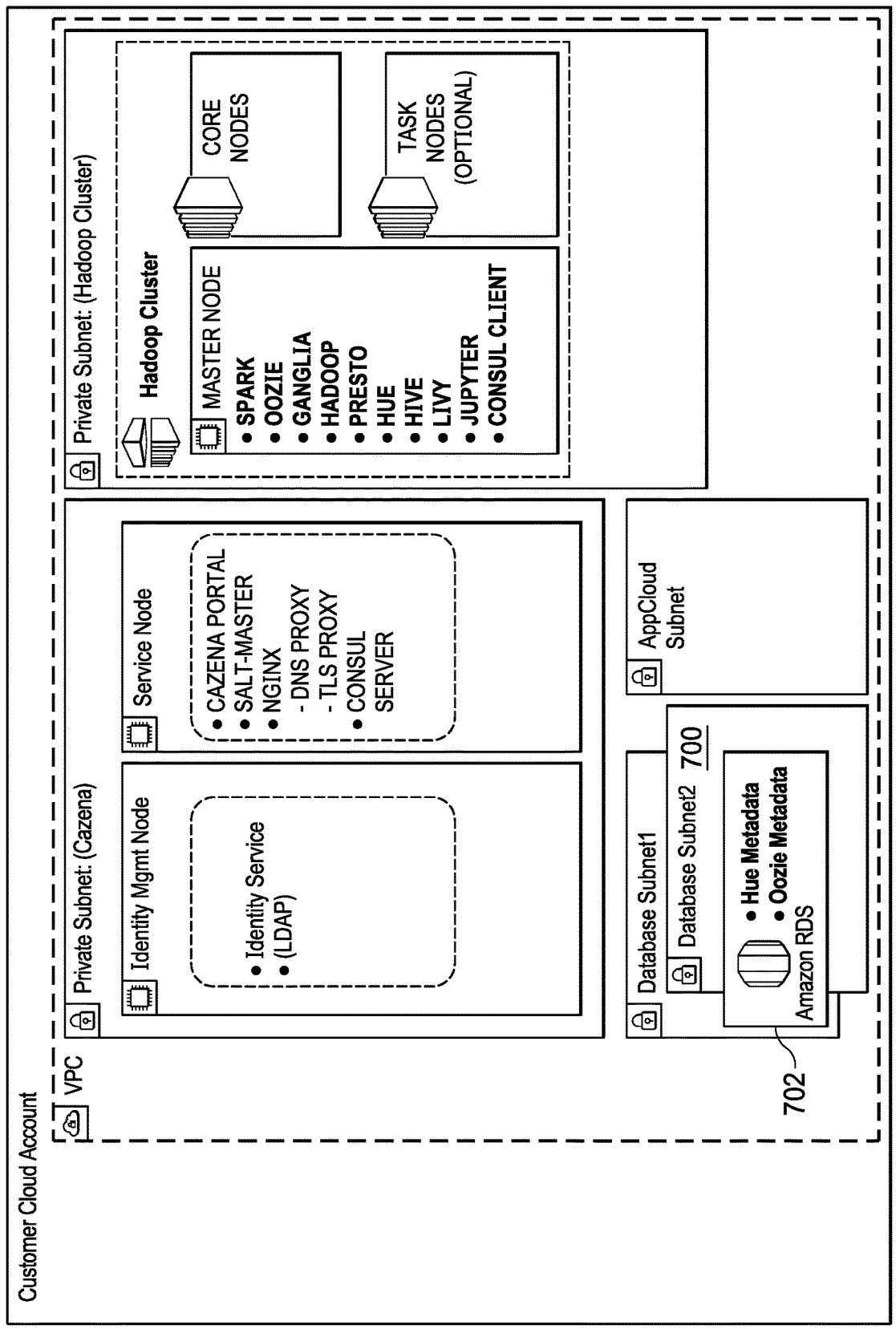
FIG. 7 depicts the provisioning of the database subnet.

As depicted in FIG. 7, within the database subnets 700, the orchestrator provisions a highly available database 702 to hold state from various data lake services so that the state is not lost when a cluster is destroyed and then recreated. Preferably, the master database resides in one subnet, the replica in the second subnet. The orchestrator also defines the security rules for database access.

Configuration of the Central Service to Hold Secrets

Preferably, the orchestrator also provisions a "secrets manager" service to hold passwords and encryption keys. The platform also ensures all secrets are encrypted with a key unique to each customer's deployment. Additionally, the platform applies secret access policies to ensure the principle of least access is maintained: only those entities that require access have access. The system automates the complexities and nuances of cloud secret management to avoid accidental or intentional misuse to ensure our customers' enterprises remain safe and secure.

Configuration of the DevOps and SecOps Monitoring and Alerting

Figure 8:
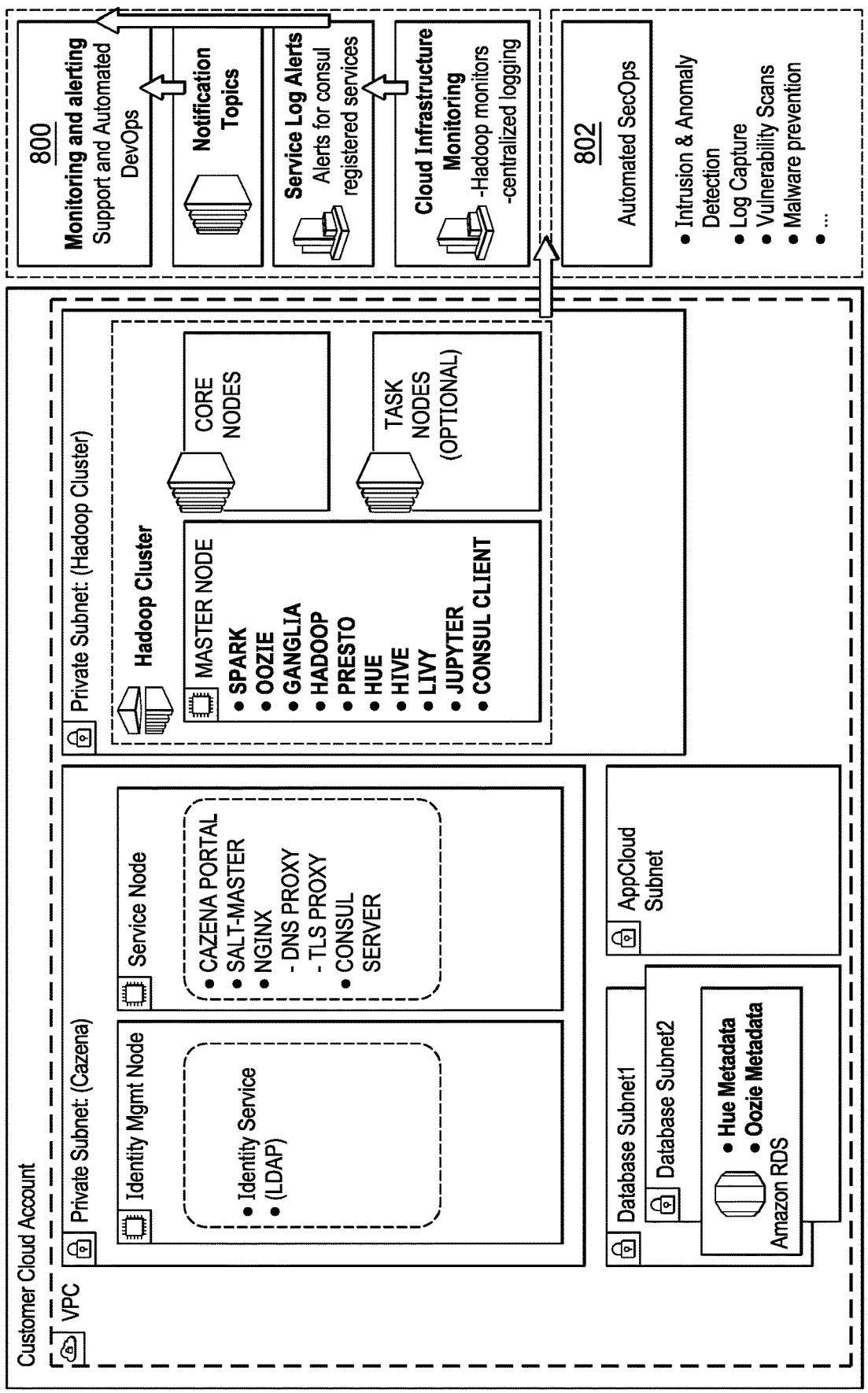
FIG. 8 depicts the provisioning of supporting SecOps and DevOps monitoring infrastructure.

As depicted in FIG. 8, the orchestrator also preferably defines DevOps 800 and SecOps 802 monitoring and alerts on the service node data lake services. Leveraging cloud native technologies (e.g., like AWS CloudWatch, Azure Monitor, and the like) and supplemented by cloud independent software (e.g., such as as Splunk, Lacework, Sensu, and ManageEngine), the platform handles the challenge of exposing key metrics and logs to centralized alert rules in order to effectively manage each customer environment. Moreover, the platform preferably also distills each customer environment's key performance indicators to a centralized Operations hub to ensure that DevSecOps staff are aware of any and all inconsistencies across our customer base, all without needing to access the system(s) or perform time-consuming manual investigations. These capabilities allow the data lake SaaS model to scale as needed to satisfy SLAs across all enterprise customers.

Preferably, the platform provides robust scaling through automatic classification of notable events into several categories. For anything that requires immediate human intervention, preferably alerts are routed through an OpsGenie-powered dispatcher to the on-call staff for the area of the issue. These alerts can fire at any time of the day or night, so it is important to ensure they have immediate, actionable value to warrant this urgency. The next level of notice is for items needing eventual human intervention, which preferably are routed to Zendesk, where a ticket is automatically created for later action by service provider staff. This ensures there is a record of the issue that will be triaged and acted on according to its priority. The final category is for issues that are notable, but that do not necessarily require human intervention at the time raised. Those end up as log messages that can be surfaced in a variety of ways, or to train machine learning models to correlate with other factors, such as workloads ongoing at that time, so that the platform then evolves its automated responses for these issues.

Provisioning of AppCloud Hosts

Figure 9:
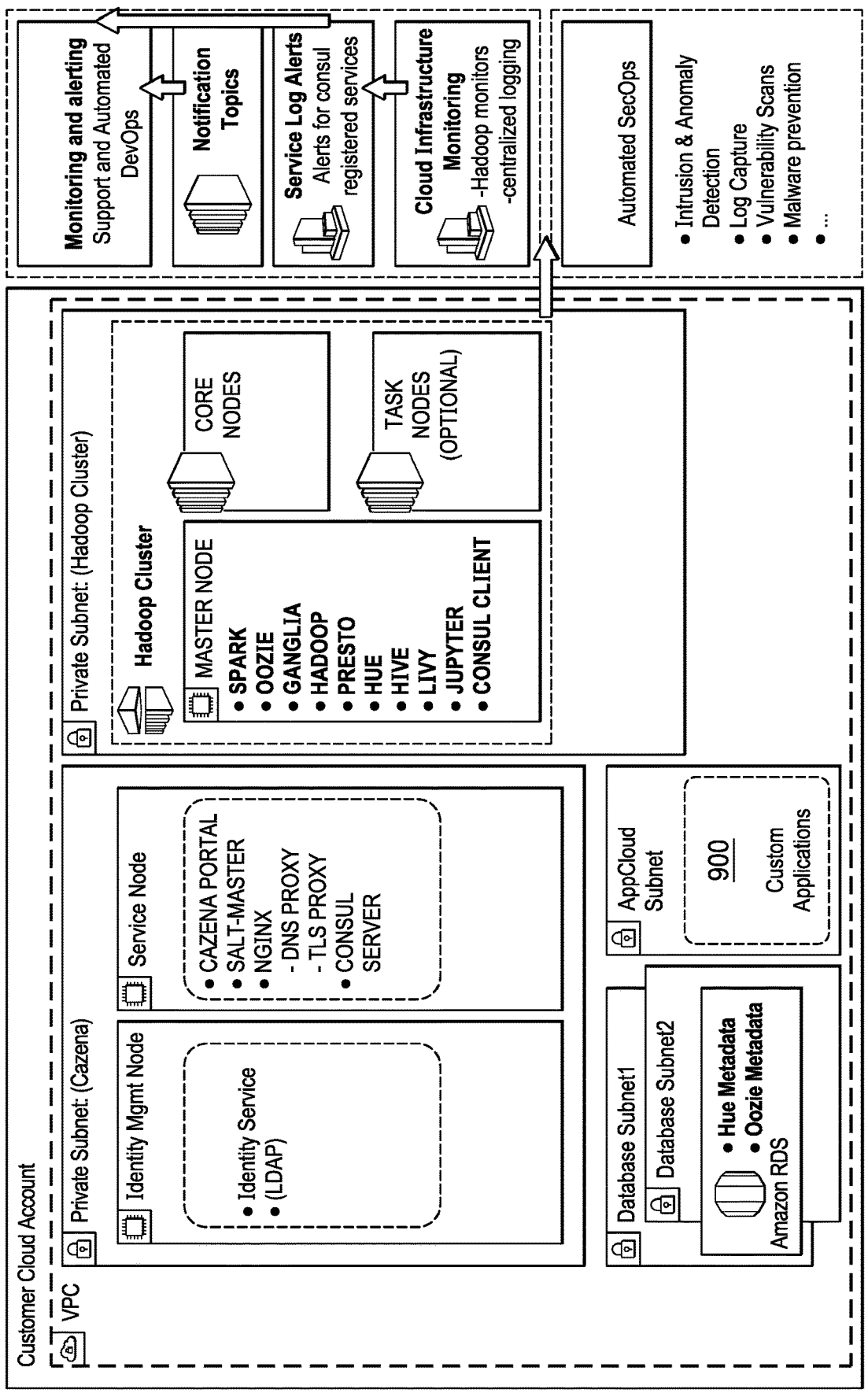
FIG. 9 depicts the provisioning of the cloud applications subnet.

As depicted in FIG. 9, and in the AppCloud subnet 900, the orchestrator provisions and configures a host to hold user-specified applications.

This completes the subnet provisioning. Although the subnet provisioning is preferably sequenced as has been described, this is not a limitation, as one or more subnets may be configured in parallel, or in one or more different sequences.

Security Management & Configuration

Figure 10:
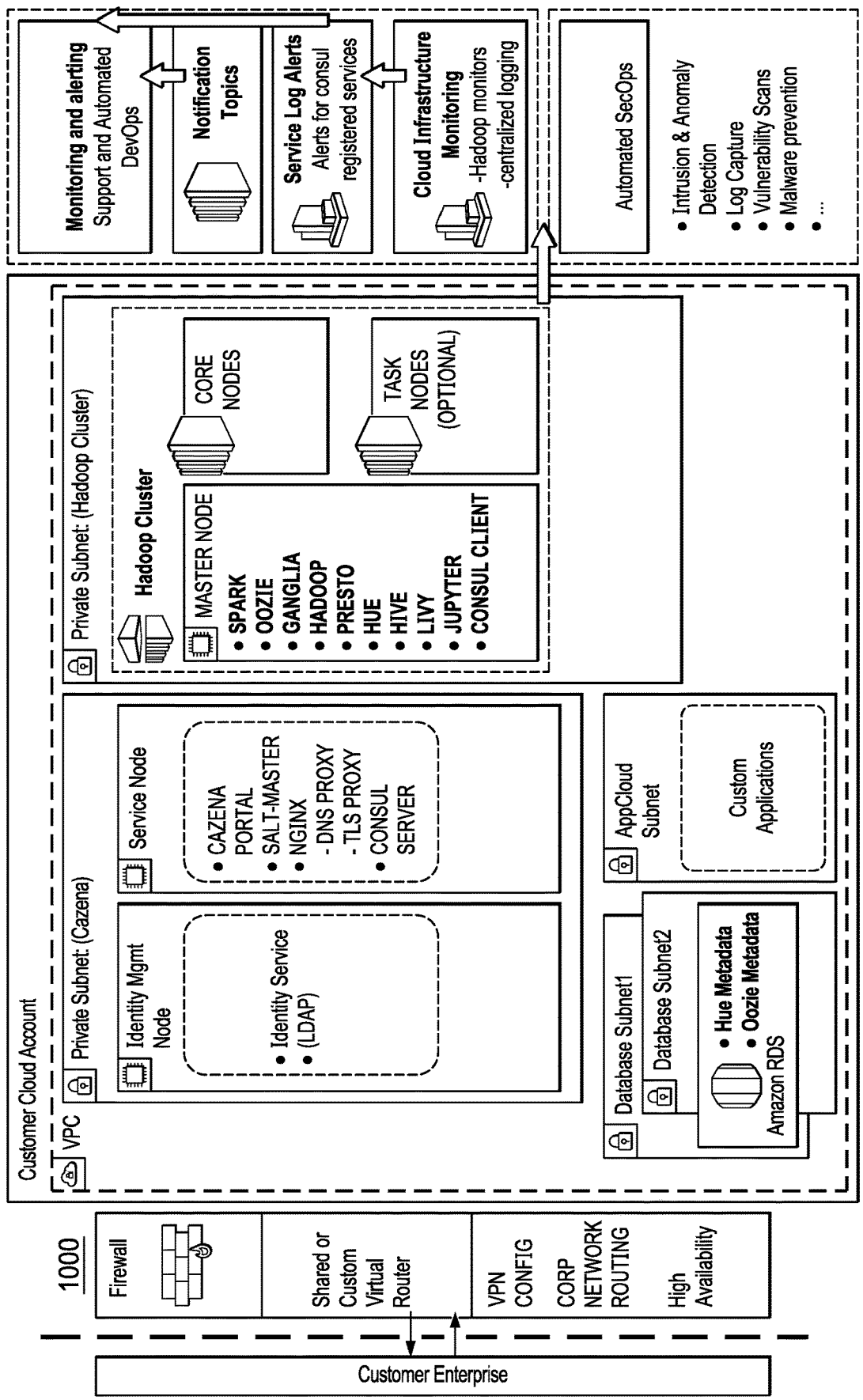
FIG. 10 depicts the provisioning of supporting security systems to ensure isolation of a customer's data lake.

As depicted in FIG. 10, preferably the orchestrator places the data lake environment behind a firewall 1000 to hide public IPs and provide a secure and auditable ingress to the data lake. The orchestrator also defines a Network Translation (NAT) gateway to translate external IP addresses to internal destinations. The orchestrator associates the firewall with the newly-provisioned data lake, and the orchestrator also sets up specific security rules for firewall access.

Self-Service Provisioning of New Applications—the Console

As described above, a data lake typically resides in a private cloud environment within a cloud provider, such as AWS or Azure. Within this virtual private cloud, and as has been described, the data lake typically is provisioned across two subnets, one subnet for the data lake engine (e.g., Cloudera CDH/CDP, AWS EMR, or other third party or cloud native PaaS stack), and the other containing services such as monitoring and alerting, orchestration (lifecycle management), and a user-visible portal through the services are accessed and managed by an authorized user. As also described, a third subnet (the AppCloud subnet) is provisioned to host the AppCloud infrastructure and AppCloud applications. Applications within this subnet can securely access the data lake engines (e.g., Spark, Hive, HBase, etc.) residing in the data lake subnet (as both subnets are configured and managed by the provider). Applications within the subnet are accessed securely from the end user's enterprise environment through connectivity rules between the provider firewall and the enterprise's firewall, preferably leveraging the existing access rules and configuration to the data lake that is defined for the corporate enterprise.

Figure 11:
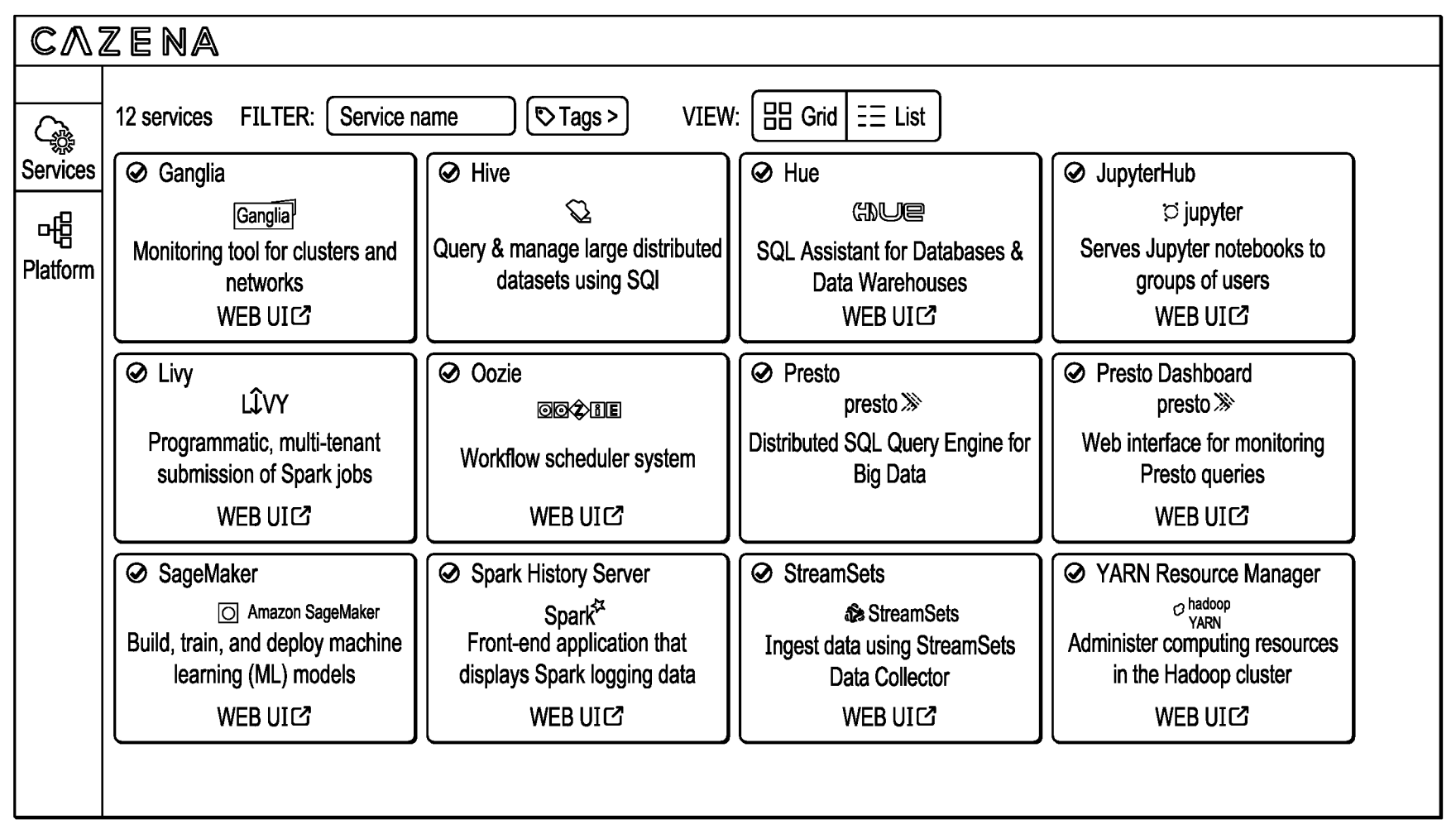

According to a further aspect, when an authorized user (e.g., an administrator) wishes to provision a new AppCloud application, he or she clicks on an AppCloud Console tile from a network-accessible Console, sometimes referred to herein as a self-service analytics Console. This gesture displays an AppCloud Console interface, from which AppCloud applications can be provisioned or decommissioned. FIG. 11 represents one possible Console-based configuration page, which layout is not intended to be limited. As depicted, the screen preferably provides a tile-based display, with each application represented by a tile. In this manner, a list of applications is displayed along with their status (provisioned, or inactive) and visibility (shown on the console, or not shown). By clicking on an active application, the user can edit its properties, making it inactive (decommissioned) or configuring its visibility on the console. By clicking on an inactive application, the user can provision the service and make it optionally visible on the console. Upon identifying the application as "provisioned," the following operations occur but without the user's knowledge or involvement: (1) the provider resource provisioning systems (as described above with respect to FIG. 1) provision whatever underlying server/host provisioning is required. The sizing, in terms of number of nodes and size of nodes, is automatically determined by the provider. Next, (2) a containerized App from an available inventory is distributed and provisioned on the new virtual host, and (3) the App is added to the console, if requested.

The data lake provides thus provides a self-service one-click SaaS console that connects a wide variety of analytical tools directly to the data lake services. As described above, and as depicted in FIG. 11, the console provides a level of SaaS abstraction so that data scientists and analysts do not need to worry themselves with platform DevOps.

Thus, the approach herein provides for supporting a diversity of end-user tools with data lakes. In this approach, users continue to use their analytical tools of choice, or they connect to new tools hosted in the AppCloud with one click. The console also provides a centralized environment to securely manage the lifecycle of data management and analytics across multiple tools and users. For example, for machine learning, an enterprise may have a group of data scientists using R and others using Python notebooks, while a separate set of analysts may use third-party ML tools like SageMaker, DataRobot, Dataiku, etc. Likewise, organizations often have different requirements for data ingestion, data discovery, cataloging, or data prep. For example, data engineers focused on for data ingestion may want to use multiple third-party, open source or cloud-native data ingestion tools such as StreamSets, Sqoop, Glue, etc. Regardless of the different enterprise requirements, the console enables real-time analytics once the data lake is instantiated.

The system administrator can add new applications to the inventory by editing a configuration file on disk and adding a containerized application to the container registry. Tools are listed in the portal and preferably include their versions. As such, users can self-service upgrade tool by performing the following steps: (1) define a new AppCloud application, with the new product version (there will now be two versions of that application, the current version, and the new version); (2) provision the new version of the application; (3) warn users that the application is being removed and to make sure that any application data is saved to persistent storage (cloud object store recommended); (4) decommission the older version of the application to remove any running instances of the application; and (5) delete the configuration for the old decommissioned version of the application.

Preferably, console access is provided via entry of a user name and password, or via single sign-on (SSO).

Cloud Data Platform (CDP) Software-as-a-Service (SasS)

The above-described SaaS-based platform automates the steps in the deployment of a generic PaaS or Cloud Data Platform, thus providing a dynamically-provisioned SaaS experience. The following describes a specific implementation of a generalized platform described above. The customer is able to use a fully configured CDP Environment and CDP Data Lake secured end to end with production grade application-aware firewalls (e.g., from Palo Alto) on cloud providers such as AWS and Azure. The following outlines the architecture and implementation design of this CDP SaaS product/service.

The CDP SaaS product herein orchestrates the end-to-end SaaS stack including the creation and configuration of the cloud account, the CDP account, the firewall and other components, to deploy a ready to use secure CDP environment. Using the approach described herein, the customer is ready immediately to create clusters, ingest data into the CDP SaaS clusters, and to perform analytics on them. The CDP SaaS solution herein accelerates time to analytics from months to minutes, particularly for LOB customers or enterprises without cloud skills.

Typical CDP deployment requires the enterprise customer to implement and operationalize IaaS cloud resources. This includes the creation of storage, VPCs, gateways, firewalls, configuration of security, roles/managed identities, creation of the CDP Environment and data lake (data hub or data warehouse), monitoring for DevOps and SecOps, patching of OS and audit for compliance and security. The IaaS deployment and DevOps/SecOps requires dependence on a separate team and adds significant friction to the enterprise. Ultimately, the value of the CDP environment is to do analytics—time to analytics can take weeks to months. The CDP SaaS approach herein automates the deployment so that the customer can create secure SaaS CDP data clusters and start doing analytics on them immediately. Additionally, by taking care of all the operational and cost aspects of the infrastructure, enterprises and LOB teams do not need to rely on skills and IT teams. Enterprises can broadly and instantly consume CDP for analytics, whether they are smaller or larger teams, IT or LOB.

As a specific example, one implementation utilizes Terraform, Bash scripts and Python code for the deploy (and later destroy) of the CDP Environment and Data Lake. In one preferred embodiment, SaltStack is deployed with a custom environment on the CDP Environment, Data Lake nodes and the Data Hub clusters for configuration management. In one embodiment, Jenkins is used to automate deploy and destroy of these resources in development and QA. Jenkins is an open source automation server that automates various software development-related activities, namely, building, testing, and deploying, facilitating continuous integration and continuous delivery. It is a server-based system that runs in servlet containers. The approach herein may also use automated test suites driven by Jenkins. This implementation can be generalized. In particular, the overall design preferably follows the steps indicated in the flowchart diagram in FIG. 12. Each of the steps in the diagram is now described.

Create new Cloud Account

Step 1200 creates a new cloud (e.g., AWS or Azure) account in which all resources will be deployed and configured for an individual customer. This step ensures that each CDP customer is isolated for security and compliance purposes. Preferably, the account is configured with a trust relationship to the service provider's deployment account, e.g., that is used to create the AWS VPCs, Subnets, Service Endpoints, the S3 Buckets or the ADLS Storage Accounts. The solution may be deployed in the service provider-owned AWS and Azure accounts (full SaaS) or customer-owned AWS and Azure accounts.

Create Secrets Manager for Deployment

At step 1202, an AWS Secrets Manager is then deployed where the CDP SaaS deployment related secrets are stored. An AWS Secrets Manager is used for deploying in AWS or Azure. Examples of deployment related secrets include CDP credentials, firewall credentials, and cloud account/subscription number. Preferably, this is created in the provider's CDP SaaS deployment account.

Integrate AD for DevOps, SecOps and Customer Accounts

Next, and at step 1204, a service provider Active Directory (AD) authentication integration for the CDP deployment for the provider's Operations and Deployment accounts is provisioned. Additional External Identity Management systems may also be provisioned if needed by the customer for their user accounts.

Configuring the CDP Account

Next, and at step 1206, a cross-account trust relationship is created between the CDP control plane account and the customer's cloud account. The CDP cloud credentials for the deployment are also created at this step.

Secrets Manager or KeyVault for Operations

Next, and at step 1208, an AWS Secrets Manager and Azure KeyVault is used to store operational credentials like the OpsGenie API key and the CDP Manager credentials. This is created in the customer's cloud account.

IAM Policies/Managed Identities for Storage, IDBroker, Datalake Admin and Ranger Next, and at step 1210, IAM Policies for AWS or the Managed Identities for Azure are created and the Storage, the IDBroker, Data Lake Admin and the Ranger are configured. An AWS role or Azure managed identity for read only and read-write access to storage is also created at this time.

Managed Keys for Encryption at Rest

Next, and at step 1212, service provider-managed keys that are used for encryption at rest (AWS S3, AWS EBS, Azure Storage, ADLS) are provisioned. These keys are persisted and managed in the cloud providers respective key stores (AWS KMS, Azure Key Vault). Policies to secure the access to the key stores as well as the keys preferably are also created at this stage.

Create Cloud Service Endpoints for DynamoDB, S3, KMS, Secrets Manager

Next, and at step 1214, AWS service endpoints for DynamoDB, S3, KMS and Secrets Manager are created for better performance and security. On Azure the service endpoints for ADLS and the KeyVault also are configured at this stage.

Create Storage Accounts

Next, and at step 1216, preferably two (2) AWS S3 buckets and two (2) Azure ADLS Gen2 accounts are created. These include an internal bucket or storage account and an external bucket or storage account. The internal bucket or storage account is accessible only from within the VPC where the CDP nodes are deployed. The external bucket or storage account is for staging the customer data and is accessible via the internet with appropriate authentication. The cluster VMs are able to access both the buckets. This enables the customer to obtain prompt access to SaaS experience for workloads.

Create CDP IAM Groups

Next, and at step 1218, CDP IAM Groups with CDP Roles assigned to them for various levels of access are created. Users can be part of one or more groups based on what kind of access they need. In this manner, creation of a new user and assigning CDP roles becomes seamless.

Create CDP Environment

Next, and at step 1220, CDP Environment creation is automated to allow the CDP control plane to securely provision environments. The CDP Environment comprises the VPCs, Subnets, Routing tables and network access rules in the case of AWS as also a FreeIPA Identity Manager compute node.

Cloud Firewall Provisioning and Configuration

Next, and at step 1222, cloud firewall provisioning and configuration is carried out. This operation creates and configures on AWS the following elements: VPCs, Subnets, Route Table, Virtual Private Gateway, Customer Gateway, VPN Connection, and NAT Gateway for end to end security for the customers. On Azure, this operation creates and configures the Local Network Gateway, Virtual Network Gateway, VPN Connection, Route Table, VNet, Security Groups for end to end security for the customers. Virtualized firewalls (e.g. Palo Alto) preferably are custom-configured using automation in-line to provide segmentation and security against threats and data exfiltration. This capability complements both Azure and AWS security features and enables the provider to continuously identify, detect, and respond to risks across the CDP environment.

Create CDP Data lake

Next, and at step 1224, the CDP Data Lake, e.g., comprising an IDBroker compute node and a Manager node, is created. This operation can be configured in parallel with the firewall setup (step 1222) to accelerate the deployment.

Configuration Management

Next, and at step 1226, the provider preferably installs a custom salt environment on the CDP master nodes with the provider's salt states. This is used for configuring the DevOps push (OpsGenie) notifications at the time of CDP deployment.

Monitoring and Notification

At step 1228, monitoring is enabled, e.g., using a CDP Manager, and a notification service is enabled, e.g., by configuring OpsGenie notifications using an Alert Publisher. These enable the provider's operations group to get notifications on the service health to enable support teams to act immediately and rectify issues before they impact the customer.

Compliance Monitoring with SIEM

Preferably, and as also shown at step 1228, a SIEM solution is used to provide security insight across the cloud and CDP platform. The solution provides notification of cloud platform configuration changes. This visibility ensures that the provisioned SaaS environments meet security and compliance standards.

Enhancements and Variants

Step 1230 depicts provisioning, configuration and deployment of other modules, or other activities. These include, for example: creation of clusters specific to customer requirements, creation and optimal configuration of clusters with specific services, installation of OS patches to the CDP Environment, Data Lake and the cluster nodes using the providers's salt states and salt environment, deployment of host-based intrusion and anomaly detection, log capture and analysis, vulnerability scans and malware prevention, DevOps monitoring and alerting, implementation of Firewall Data Filtering Profiles to prevent sensitive, confidential and proprietary information from leaving the CDP environment, SecOps integration, and implementation of a centralized dashboard for metrics for all the deployments of the customer.

Figure 12:
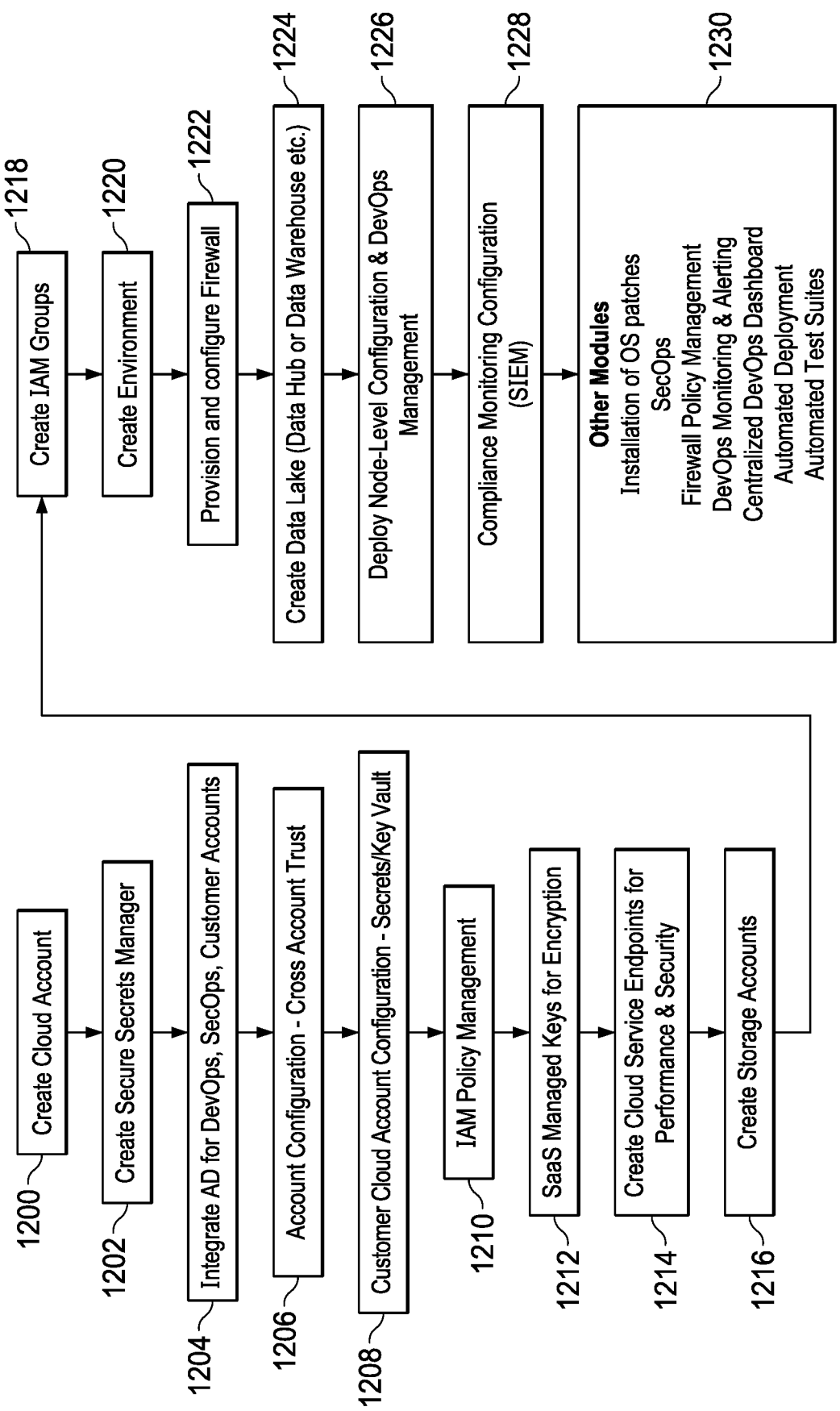
FIG. 12 depicts a process flow describing representative automation and orchestration to enable SaaS-based CDP according to this disclosure.

It is not required that all steps shown in FIG. 12 be carried out, or that the steps be carried out in the particular sequence depicted. One or more of the steps may be combined together.

Figure 13:
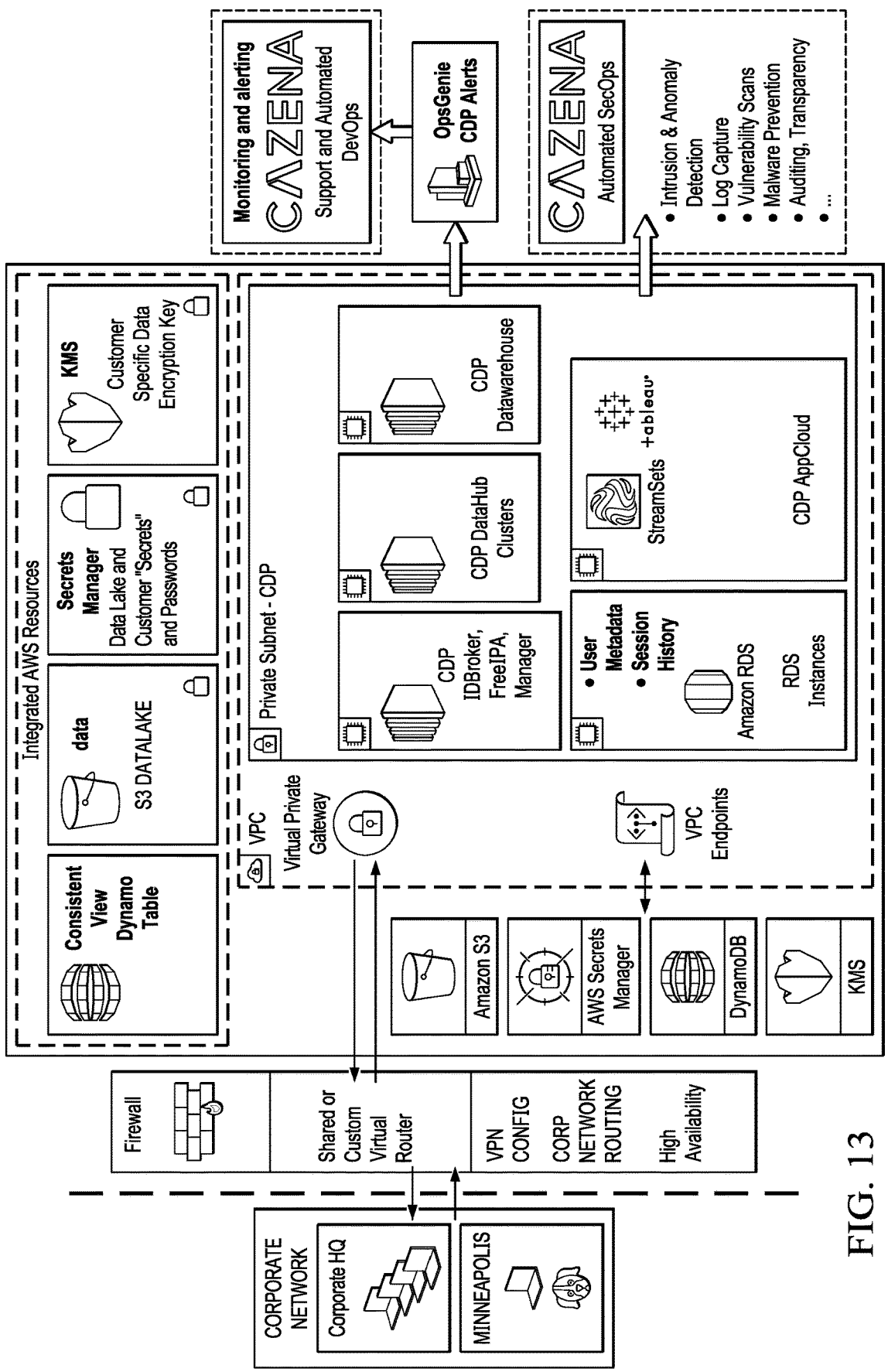
FIG. 13 depicts a representative CDP implementation.

FIG. 13 is an architecture diagram of a representative SaaS deployment for a customer. As depicted, the deployment comprises a private data cloud (PDC) 1300. The PDC is a secure envelope that is not accessible over the publicly-routed Internet (it is has no public interface that allows public access) but is only accessible via firewall 1302, which acts as a secure edge for the customer's deployment and for enabling service provider access. A PDC comprises a private VPC/Vnet and their associated cloud services and components, and it is only used by the customer (and no other customer). Preferably, PDC is deployed in an entirely automated process. The firewall 1302 is connected to the PDC 1300 using a VPN tunnel. The customer's authorized users 1304 connect to the PDC through the firewall 1302, and the service provider also connects in the same manner, e.g., to provide support. The service provider also typically provides other management services such as monitoring and alerting 1306, automated security operations 1308, and the like.

Onboarding a new customer typically involves three steps: (1) cloud account/tenant creation, (2) cloud account/tenant setup, and then (3) PDC deployment. Preferably, cloud account/tenant creation and setup for a customer is automated (e.g., using Terraform, and Python scripts) in all or substantial part and involves: creating a new cloud account, within that new cloud account creating an IAM role (or Azure AD) app registration that can be used by the service provider's automation, creating and assigning right policies/permissions to the IAM role or Azure AD app, and creating an account secret for the new account that can be identified by a unique customer account alias. Then, customer sensitive information is stored in that account secret, which is then hosted for example in AWS Secrets Manager 1310. Cloud account/tenant setup may also involve obtaining a new CDP tenant for the new customer, and generating a CDP machine user and obtaining its CDP credential keys. The automation generates an SSH keypair and saves it to the account secret, creates the IAM role or Azure AD registration, creates and assign right policies/permissions to the IAM role or Azure AD app, creates the CDP credentials, configures the service providers's SecOps requirements, and sets up access for the service provider's support team. PDC deployment creates the resources required to securely provision the CDP services, creates and sets up the firewall, creates the CDP environment and data lake, sets up CDP IAM groups, permissions and idbroker mappings, and creates custom templates and definitions to be used for datahub cluster deployments.

A goal is to reliably deploy (e.g., in a time scale measured in minutes) a fully-secure, single-tenant, custom shape analytics data lake.

Figure 14:
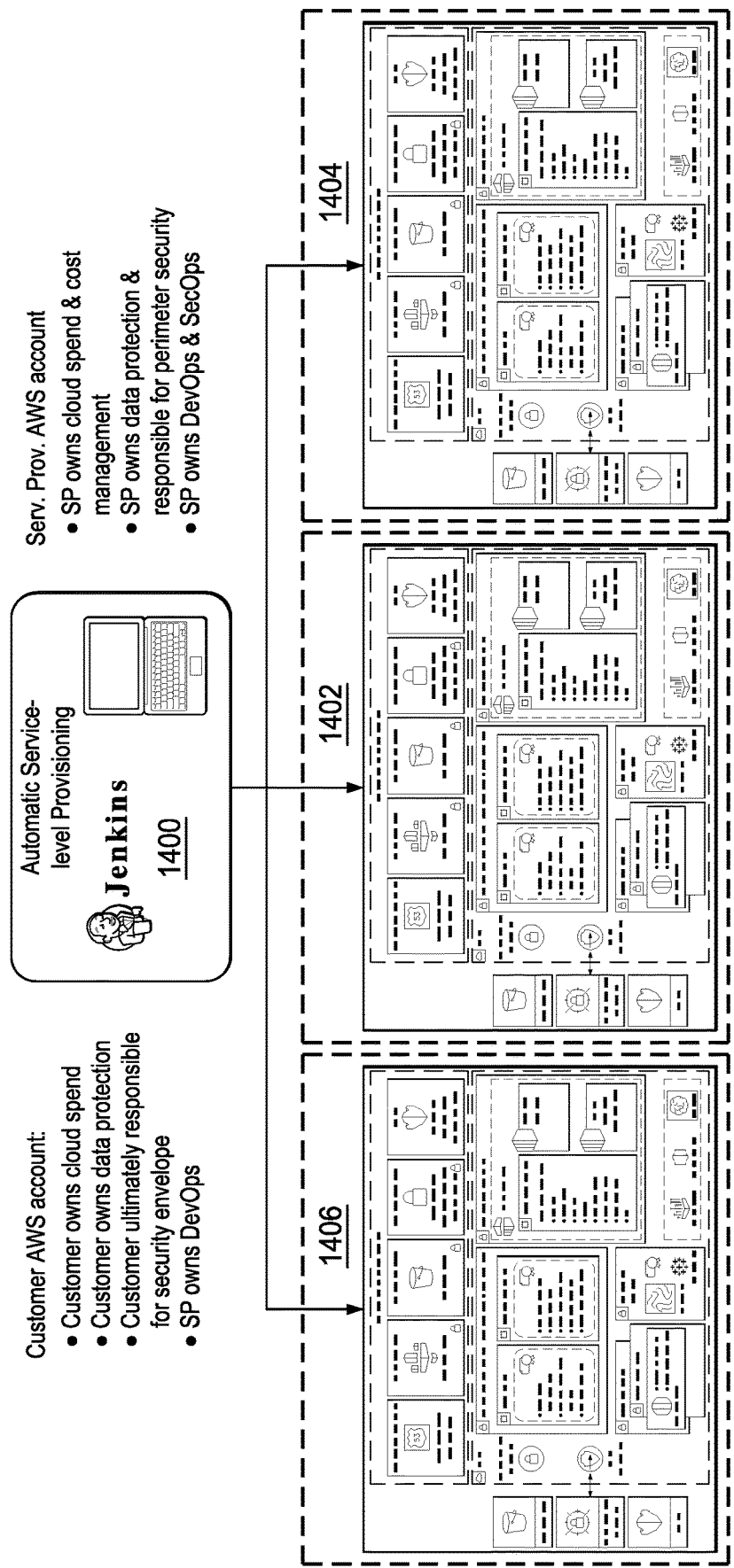
FIG. 14 depicts cloud account provisioning in additional detail.

FIG. 14 depicts a typical AWS native implementation and allocations with respect to the customer AWS account, and the service provider AWS account. A provisioning server 1400 (e.g., running Jenkins) is configured by the service provider in an operations account 1402, and cross-account trust(s) are then used to deploy into a service provider-owned account 1404, or a customer-owned account 1406. As depicted, in the customer-owned account 1406, the customer owns the cloud spend, data protection, for the security envelope (the PDC), and the SP owns DevOps. The server 1400 runs a job (e.g., using a script) to create the accounts and setup all of the trust relationships.

Figure 15:
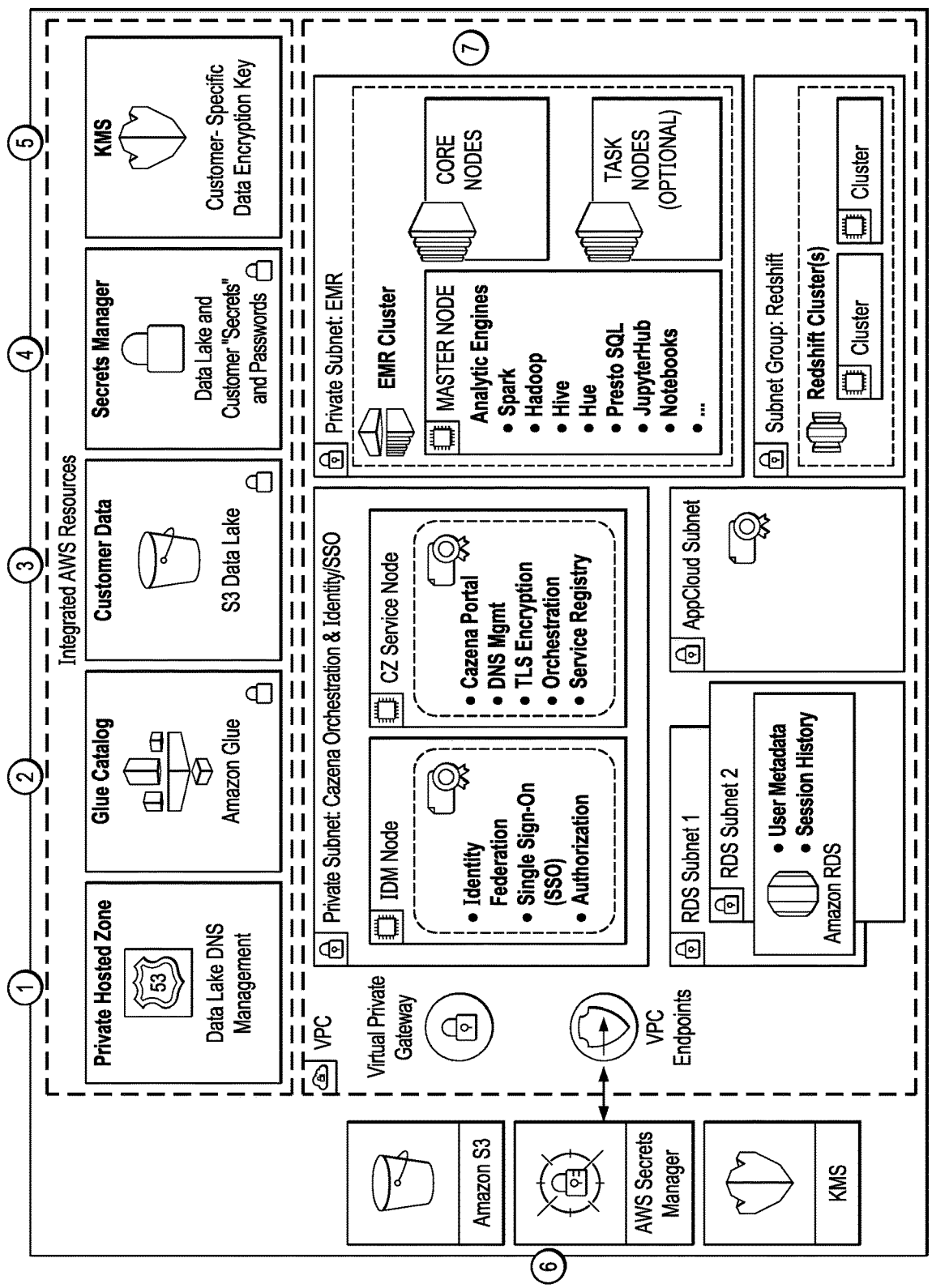
FIG. 15 depicts the infrastructure provisioning for a PDC in additional detail.

FIG. 15 depicts provisioning infrastructure in association with a PDC deployment. These operations may also be carried out by the provisioning server (Jenkins) described above. As shown, steps (1)-(5) set up DNS service, glue catalogs, S3 buckets, secrets management, and encryption keys for the various services. Step (6) provisions VPC endpoints, and step (7) sets up one or more analytics engines (e.g., via Amazon EMR). A VPC endpoint enables private connections between the VPC and supported AWS services, such that traffic between the VPC and such other services does not exist the AWS network. Typically, a VPC endpoint is a virtual device.

Figure 16:
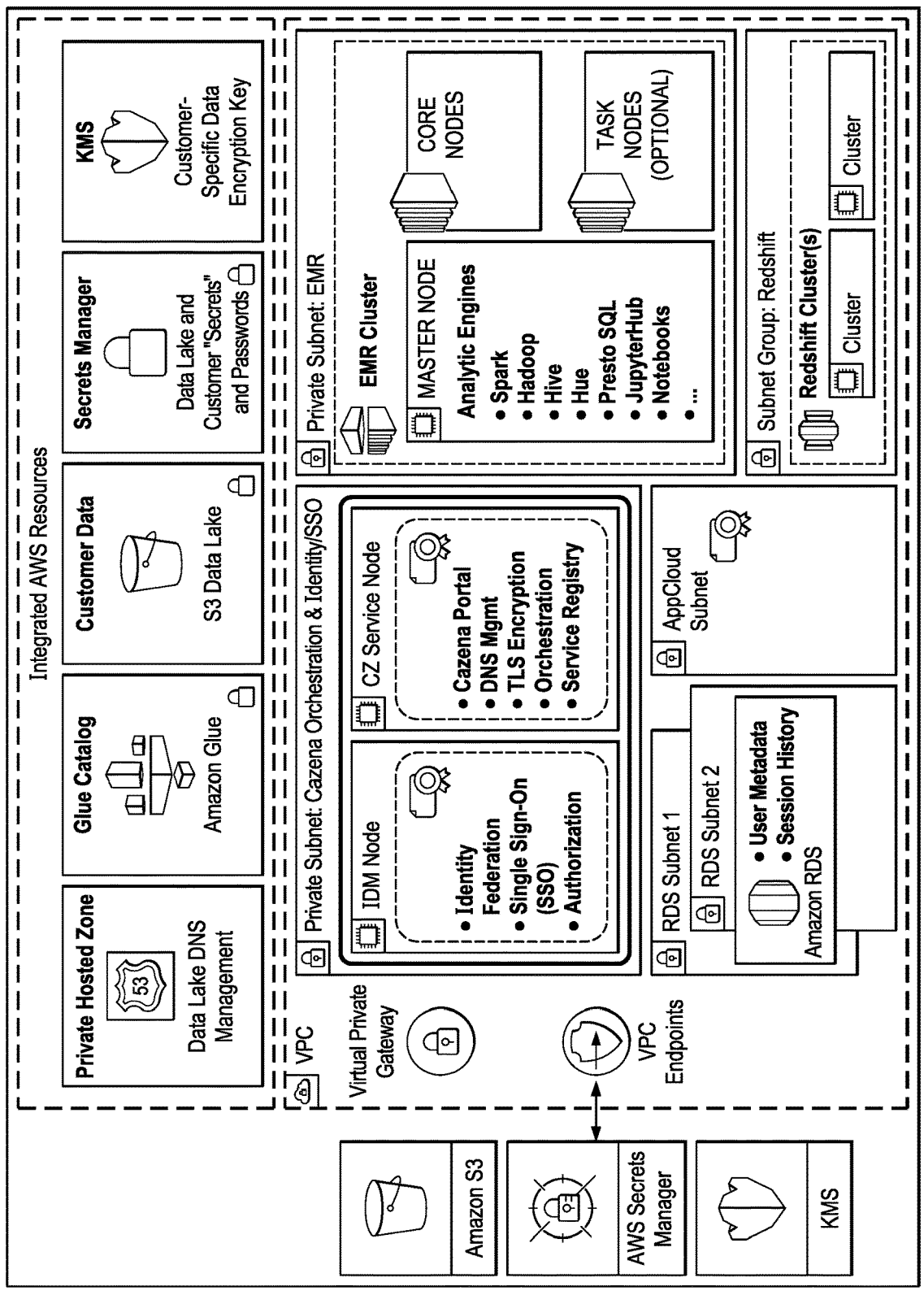
FIG. 16 depicts the provisioning of one or more services of the service provider for use in association with the deployed infrastructure for a customer.
Figure 17:
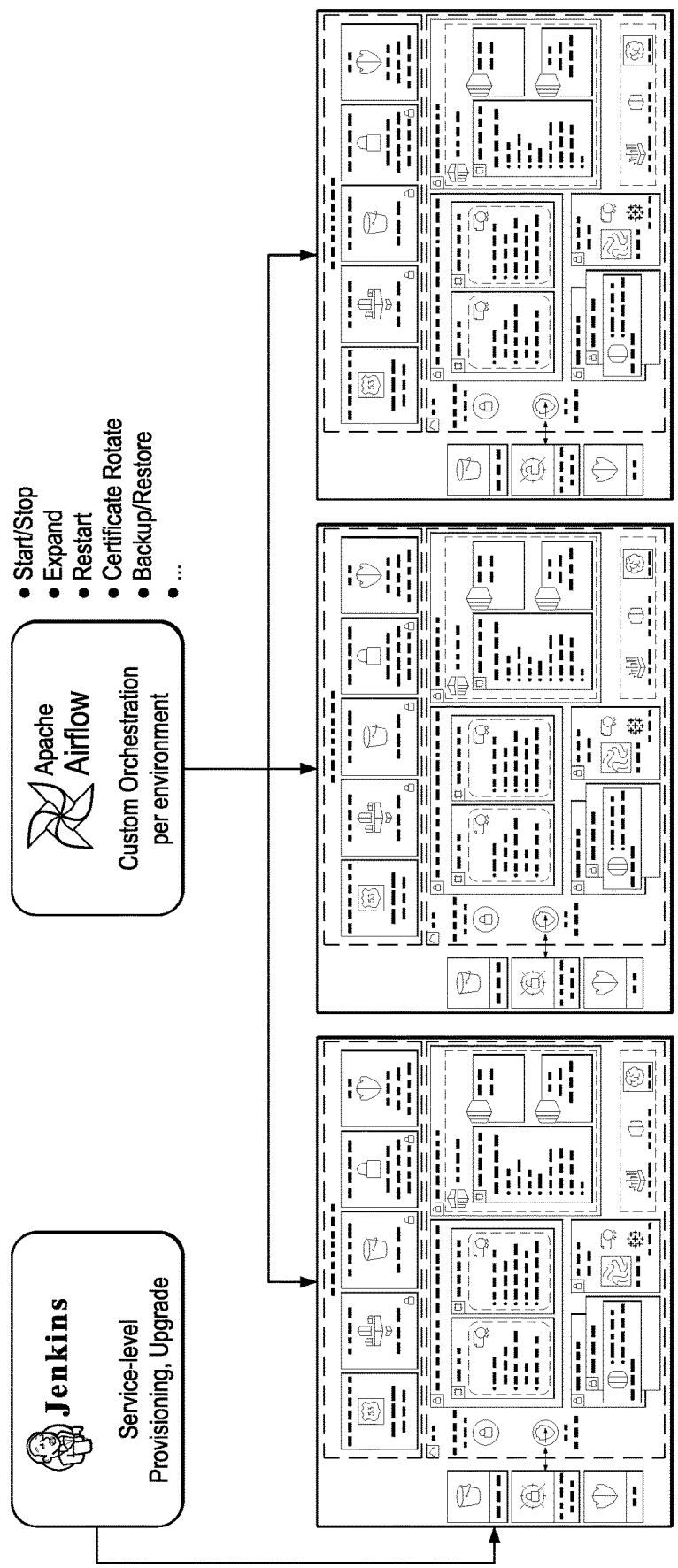
FIG. 17 depicts an implementation wherein DevOps operations are provided by a separate orchestration server.

FIG. 16 depicts provisioning of various service provider services that include authentication, authorization, console, service registry, security, and monitoring and alerting. FIG. 17 depicts a representative DevOps operations flow wherein, in addition to the provisioning service 1700 (which provides provisioning as described, and upgrades), a DevOps service 1702 (e.g., Apache Airflow) is configured per environment to provide various services such as start/stop, expand, restart, certification revocation, backup/restore, and the like. Some of these services may be provided by scripts executing in the provisioning service, depending on implementation. In these environments, on-going security and compliance is enabled and enforced using managed encryption (AWS managed keys), automated controls, high level auditing (e.g., of instance level vulnerability scans and intrusion detection, and centralized security and log aggregators with high level dashboards), and centralized network control over egress and policies associated with the firewall.

Figure 18:
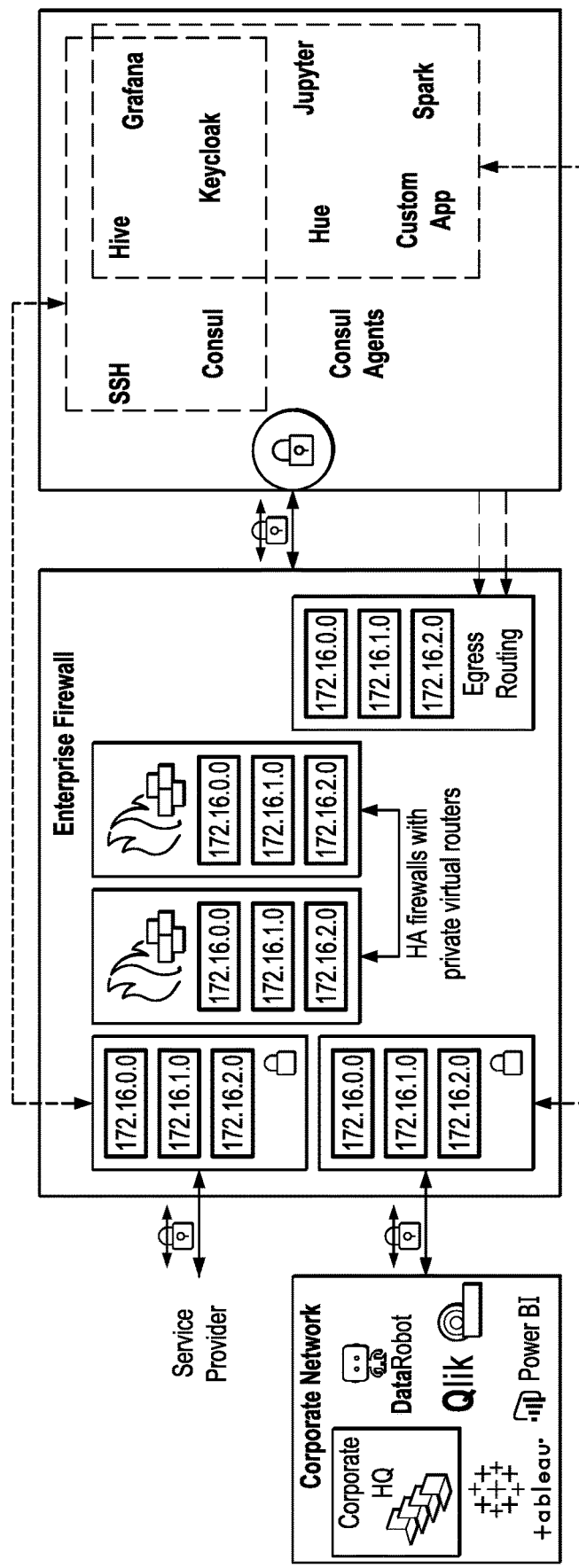
FIG. 18 depicts secure enterprise access when the service provider owns the account associated with the deployment account.
Figure 19:
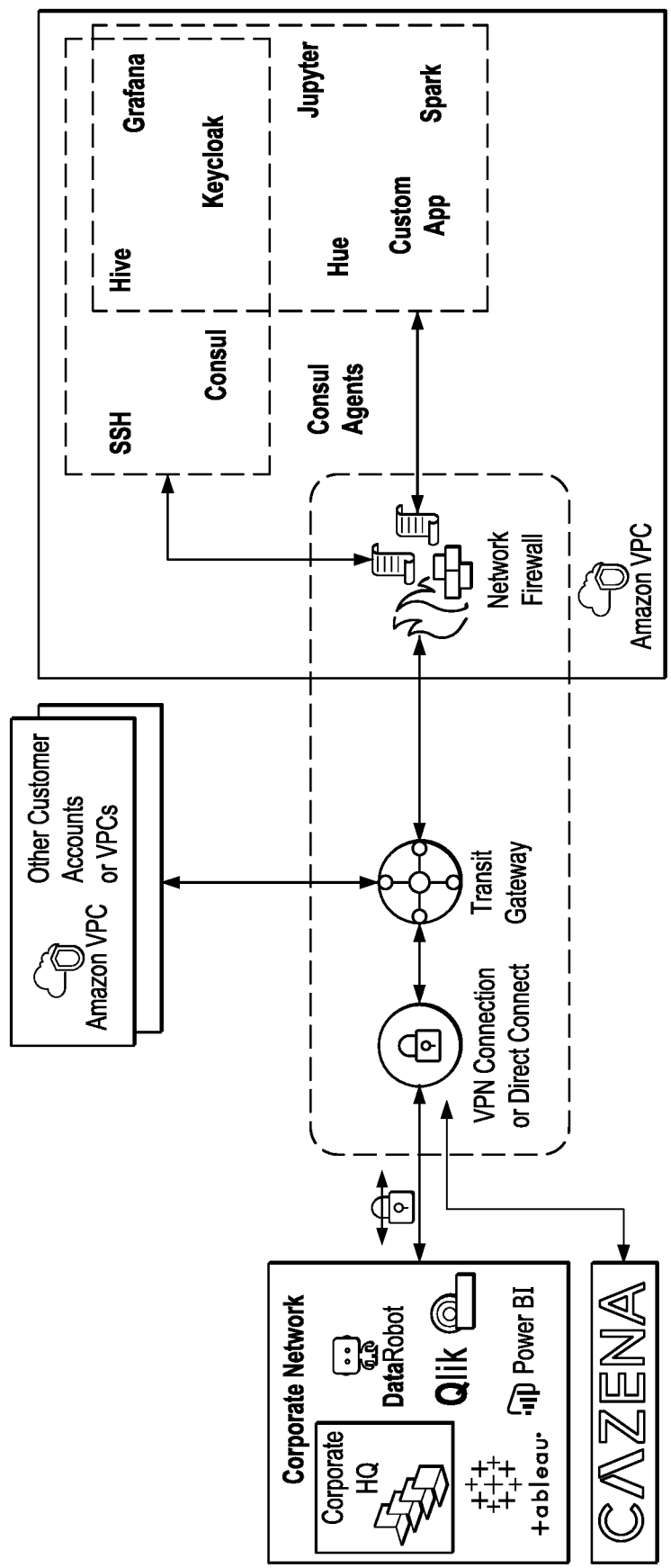
FIG. 19 depicts secure enterprise access when the customer owns an account and desires to connect to the provisioned infrastructure via its own connectivity.

FIG. 18 depicts a preferred technique for secure enterprise access to the cloud account deployment (and in particular the customer's PDC 1800) provisioned for the customer 1802 by the service provider 1804. This is a typical configuration where the service provider 1804 has deployed the PDC 1800 (the deployment account) in one of the service provider's accounts. In this embodiment, the service provider has a separate account in which a firewall service 1806 is executing. The service provider 1804 connects for providing support, and the customer's enterprise network 1802 connects as previously describes. The firewall service 1806 runs high availability (HA) firewalls that are synchronized via private virtual routers. Within the firewall service, firewall settings are synchronized, rule sets are duplicated as necessary, vulnerability policies are updated, etc., and egress routing is monitored. Different profiles may be provided for different access (e.g., by the service provider, or by authorized enterprise users). In an alternative embodiment, the customer owns the AWS account, the secure enterprise access may occur through a transit gateway. In this embodiment, as shown in FIG. 19, a network firewall 1900 is deployed in association with the customer's PDC (still deployed in a separate account) and connects to a transit gateway 1902. In this embodiment, the customer enterprise network direct connects via a VPN connection 1904 coupled to the transit gateway 1902.

Figure 20:
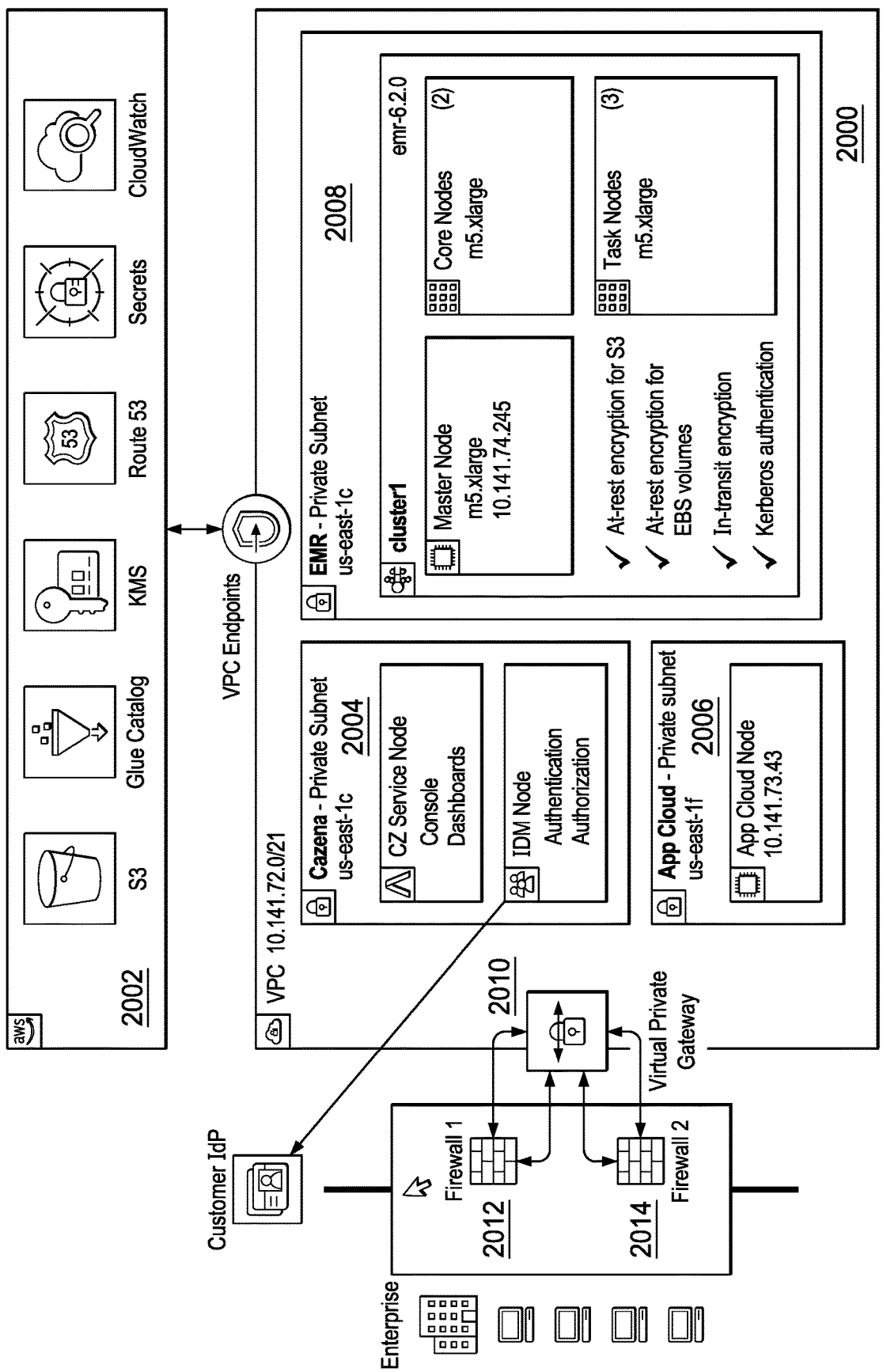
FIG. 20 is visualization of an example set of infrastructure that has been provisioned for a customer according to the techniques described above.

FIG. 20 a representative visualization of an example set of infrastructure that has been provisioned for a customer according to the techniques described above. As has been described, the platform provides for rapid deployment and instantiation of a data lake within a virtual private cloud (VPC) 2000 (referred to above as PDC) that includes various subnets as previously described. In addition to setting up the account, the service sets up all of the VPC endpoints and associated services 2002. The VPC 2000 comprises a first subnet 2004 hosts the service provider's services, such as the console, various dashboards, and the authentication and authorization services. A second subnet 2006 hosts App-Cloud, which can be used to enable third party products and services that the customer uses to be hosted with the VPC. The third subnet 2006 in this example is used to host the EMR service on which one or more analytics products and services execute. The VPC itself is connected to a firewall pair (firewalls 2012 and 2014) via a virtual private gateway 2010. Preferably, there is a firewall pair provisioned per AWS region. If the enterprise has its own firewall (not shown), that firewall is connected to the firewall pair via site-to-site VPN. In this configuration, the enterprise users can use existing DNS entries to access the provisioned infrastructure. Likewise, any of the services within the provisioned infrastructure can access on-premises resources (e.g., an enterprise database) via the firewalls. This network connectivity is seamless and secure because the firewalls enforce security policies and provide audit controls.

While the above describes a particular order of operations performed by certain embodiments of the disclosed subject matter, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject matter also relates to apparatus for performing the operations herein. This apparatus may be specially constructed for the required purposes, or it may comprise a computer selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus. A computer-readable medium having instructions stored thereon to perform the ingest, index, search and retrieval functions is non-transitory.

A given implementation of the disclosed subject matter is software written in a given programming language that runs on a server on commodity hardware platform running an operating system, such as Linux.

As noted above, the above-described SaaS orchestration functions may be implemented as well as a virtual machine or appliance, or in any other tangible manner.

While given components of the system have been described separately, one of ordinary skill will appreciate that some of the functions may be combined or shared in given instructions, program sequences, code portions, and the like.

The functionality may be implemented with other application layer protocols besides HTTP/HTTPS, or any other protocol having similar operating characteristics.

There is no limitation on the type of computing entity that may implement the client-side or server-side of any communication. Any computing entity (system, machine, device, program, process, utility, or the like) may act as the client or the server.

While given components of the system have been described separately, one of ordinary skill will appreciate that some of the functions may be combined or shared in given instructions, program sequences, code portions, and the like. Any application or functionality described herein may be implemented as native code, by providing hooks into another application, by facilitating use of the mechanism as a plug-in, by linking to the mechanism, and the like.

The platform functionality may be co-located or various parts/components may be separately and run as distinct functions, perhaps in one or more locations (over a distributed network).

What is claimed follows below:

1. A method for rapid deployment by a service provider of a data lake in association with a cloud computing service, comprising:
   responsive to receipt of a request to provision the data lake, creating a new cloud account;
   within the new cloud account, creating a service provider access role and associated permissions;
   associating, by cross-trust, the new cloud account with an account in the cloud computing service that is one of: a service provider deployment account, and a customer account;
   associating a private data cloud with the service provider deployment account or the customer account, the private data cloud being uniquely associated with the new cloud account and the data lake;
   provisioning a firewall service in association with the private data cloud, the firewall service enabling secure access between the data lake and an external enterprise network; and
   provisioning the data lake in the private data cloud to complete the rapid deployment; wherein the method is carried out in an automated manner in software executing on hardware.

2. The method as described in claim 1 further including provisioning one or more virtual private cloud endpoints to provide one or more services to the private data cloud.

3. The method as described in claim 2 wherein the one or more services include one of: a domain name service (DNS), a data integration service for analytics, machine learning and application development, a data storage service, a secrets manager, and a key management service.

4. The method as described in claim 1 wherein the private data cloud comprising a set of subnets.

5. The method as described in claim 4 wherein a given subnet of the set of subnets hosts one or more services associated with the service provider.

6. The method as described in claim 4 wherein a given subnet of the set of subnets hosts a big data platform that supports one or more data lake engines.

7. The method as described in claim 1 wherein the data lake is provisioned at a time scale measured in minutes.

8. The method as described in claim 1 wherein the data lake is a single tenant operating environment accessible via the firewall service from the external enterprise network.

9. The method as described in claim 1 further including receiving a request to instantiate an analytics engine in the data lake, the request to instantiate initiated at a network-accessible console.

10. The method as described in claim 1 further including configuring a monitoring service in association with the data lake, the monitoring service being associated with one of: Developer/IT operations (DevOps) and Security/IT operations (SecOps).

11. A software-as-a-service computing platform, comprising:
   computing hardware;
   computer software executing on the computing hardware, the computer software comprising program code executed on the computing hardware and configured to provide rapid deployment by a service provider of a data lake in association with a cloud computing service by:
   responsive to receipt of a request to provision the data lake, creating a new cloud account;
   within the new cloud account, creating a service provider access role and associated permissions;
   associating, by cross-trust, the new cloud account with an account in the cloud computing service that is one of: a service provider deployment account, and a customer account;
   associating a private data cloud with the service provider deployment account or the customer account, the private data cloud being uniquely associated with the new cloud account and the data lake;
   provisioning a firewall service in association with the private data cloud, the firewall service enabling secure access between the data lake and an external enterprise network; and
   provisioning the data lake in the private data cloud to complete the rapid deployment.

12. The computing platform as described in claim 11 wherein the program code is further configured to provision one or more virtual private cloud endpoints to provide one or more services to the private data cloud.

13. The computing platform as described in claim 12 wherein the one or more services include one of: a domain name service (DNS), a data integration service for analytics, machine learning and application development, a data storage service, a secrets manager, and a key management service.

14. The computing platform as described in claim 11 wherein the private data cloud comprises a set of subnets.

15. The computing platform as described in claim 14 wherein a given subnet of the set of subnets hosts one or more services associated with the service provider.

16. The computing platform as described in claim 14 wherein a given subnet of the set of subnets hosts a big data platform that supports one or more data lake analytics engines.

17. The computing platform as described in claim 14 wherein the data lake is provisioned at a time scale measured in minutes.

18. The computing platform as described in claim 11 wherein the data lake is a single tenant operating environment accessible via the firewall service from the external enterprise network.

19. The computing platform as described in claim 11 wherein the program code is further configured to receive a request to instantiate an analytics engine in the data lake, the request to instantiate initiated at a network-accessible console.

20. The computing platform as described in claim 11 further including configuring a monitoring service in association with the data lake, the monitoring service being associated with one of: Developer/IT operations (DevOps) and Security/IT operations (SecOps).

* * * * *